(12) United States Patent
Wu et al.

(10) Patent No.: US 11,182,408 B2
(45) Date of Patent: Nov. 23, 2021

(54) GENERATING AND APPLYING AN OBJECT-LEVEL RELATIONAL INDEX FOR IMAGES

(71) Applicant: Microsoft Technology Licensing, LLC, Redmond, WA (US)

(72) Inventors: Kun Wu, Bellevue, WA (US); Yiran Shen, Bellevue, WA (US); Houdong Hu, Redmond, WA (US); Soudamini Sreepada, Hyderabad (IN); Arun Sacheti, Sammamish, WA (US); Mithun Das Gupta, Hyderabad (IN); Rushabh Rajesh Gandhi, Hyderabad (IN); Sudhir Kumar, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 16/417,902

(22) Filed: May 21, 2019

(65) Prior Publication Data
US 2020/0372047 A1    Nov. 26, 2020

(51) Int. Cl.
*G06F 16/00*      (2019.01)
*G06F 16/28*      (2019.01)
(Continued)

(52) U.S. Cl.
CPC ............ *G06F 16/284* (2019.01); *G06F 16/22* (2019.01); *G06F 16/532* (2019.01); *G06F 16/583* (2019.01); *G06F 16/587* (2019.01)

(58) Field of Classification Search
CPC ...... G06F 16/284; G06F 16/22; G06F 16/583; G06F 16/587; G06F 16/532; G06F 16/9024; G06F 16/5854; G06F 16/51
See application file for complete search history.

(56) References Cited

U.S. PATENT DOCUMENTS 7,254,285 B1 *   8/2007   Paek ................... G06K 9/4685
                                                                358/453
8,923,551 B1 *  12/2014   Grosz ................ H04N 1/00196
                                                                382/100
(Continued)

FOREIGN PATENT DOCUMENTS

WO    1998050869 A1    11/1998
WO    2000028467 A1     5/2000

OTHER PUBLICATIONS

PCT Search Report and Written Opinion in PCT/US2020/025097, dated Jun. 16, 2020, 12 pages.
(Continued)

*Primary Examiner* — Hung Q Pham

(57) ABSTRACT

A computer-implemented technique is described herein for using a machine-trained model to identify individual objects within images. The technique then creates a relational index for the identified objects. That is, each index entry in the relational index is associated with a given object, and includes a set of attributes pertaining to the given object. One such attribute identifies at least one latent semantic vector associated with the given object. Each attribute provides a way of linking the given object to one or more other objects in the relational index. In one application of this technique, a user may submit a query that specifies a query object. The technique consults the relational index to find one or more objects that are related to the query object. In some cases, the query object and each of the other objects have a complementary relationship.

10 Claims, 15 Drawing Sheets

(51) Int. Cl.
*G06F 16/22* (2019.01)
*G06F 16/583* (2019.01)
*G06F 16/587* (2019.01)
*G06F 16/532* (2019.01)

(56) References Cited

U.S. PATENT DOCUMENTS

| | | | | |
|---|---|---|---|---|
| 9,285,871 | B2* | 3/2016 | Geisner | H04N 13/344 |
| RE46,973 | E* | 7/2018 | Mohan | G06F 16/34 |
| 10,169,684 | B1 | 1/2019 | Nathan et al. | |
| 2006/0253491 | A1* | 11/2006 | Gokturk | G06F 16/5846 |
| 2010/0268720 | A1* | 10/2010 | Spivack | G06F 16/9537 |
| | | | | 707/756 |
| 2013/0246438 | A1* | 9/2013 | Gestrelius | G06F 16/2237 |
| | | | | 707/745 |
| 2014/0019450 | A1* | 1/2014 | Rus | G06F 16/332 |
| | | | | 707/736 |
| 2014/0337373 | A1 | 11/2014 | Morsi et al. | |
| 2015/0294187 | A1* | 10/2015 | Sorakado | G06K 9/6215 |
| | | | | 382/195 |
| 2017/0201851 | A1* | 7/2017 | Huang | H04L 51/32 |
| 2017/0344823 | A1* | 11/2017 | Withrow | G06F 21/30 |
| 2018/0268024 | A1* | 9/2018 | Bandyopadhyay | G06F 16/284 |
| 2018/0307706 | A1* | 10/2018 | Xiao | G06K 9/00771 |
| 2019/0318405 | A1* | 10/2019 | Hu | G06F 16/55 |

OTHER PUBLICATIONS

Fang, et al., "From Captions to Visual Concepts and Back," arXiv:1411.4952v3 [cs.CV], Apr. 14, 2015, 10 pages.

Ren, et al., "Faster R-CNN: Towards Real-Time Object Detection with Region Proposal Networks," arXiv:1506.01497v3 [cs.CV], Jan. 6, 2016, 14 pages.

Krizhevsky, et al., "ImageNet Classification with Deep Convolutional Neural Networks," in Advances in Neural Information Processing Systems 25 (NIPS 2012), 2012, 9 pages.

Radford, et al., "Unsupervised Representation Learning with Deep Convolutional Generative Adversarial Networks," arXiv:1511.06434v2 [cs.LG], Jan. 7, 2016, 16 pages.

Lin, et al., "Focal Loss for Dense Object Detection," arXiv:1708.02002v2 [cs.CV], Feb. 7, 2018, 10 pages.

Liu, et al., "SSD: Single Shot MultiBox Detector," arXiv:1512.02325v5 [cs.CV], Dec. 29, 2016, 17 pages.

Goodfellow, et al., "Generative Adversarial Nets," arXiv:1406.2661v1 [stat.ML], Jun. 10, 2014, 9 pages.

Gupta, et al., "Finding Complementary Digital Images Using a Conditional Generative Adversarial Network," U.S. Appl. No. 16/249,243, filed Jan. 16, 2019, 58 pages.

* cited by examiner

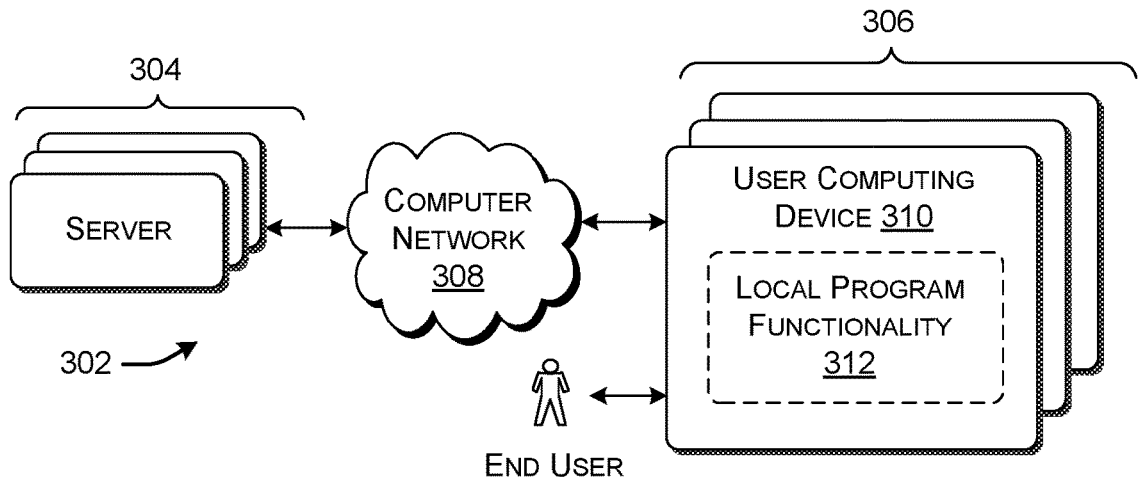
FIG. 3
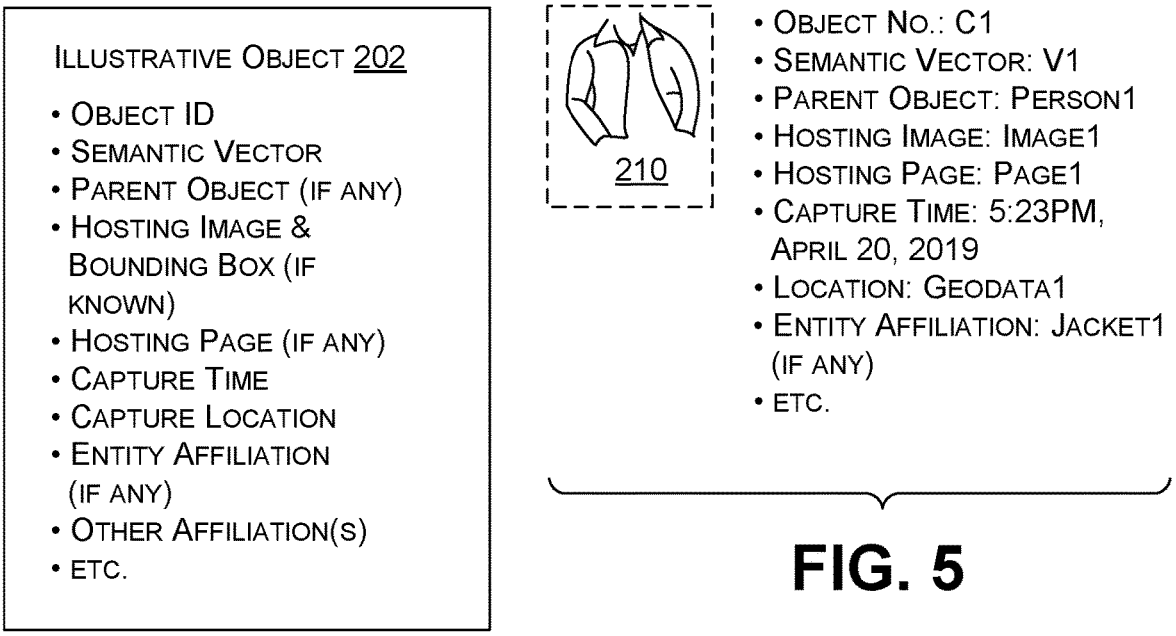
FIG. 4
FIG. 5

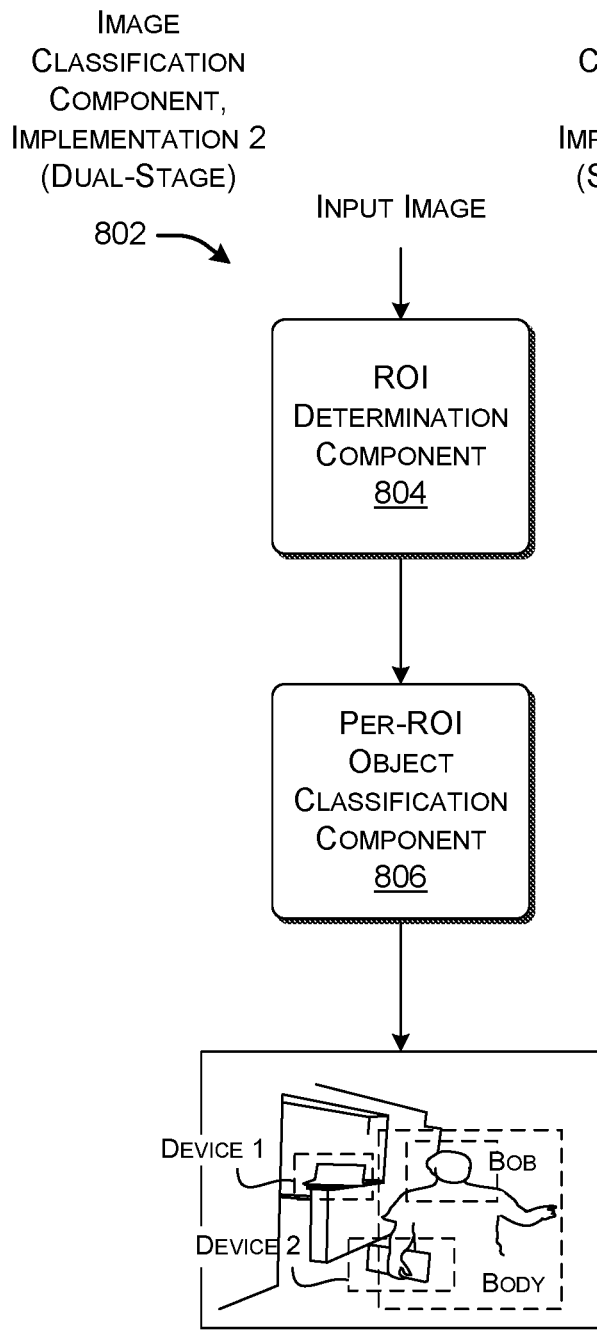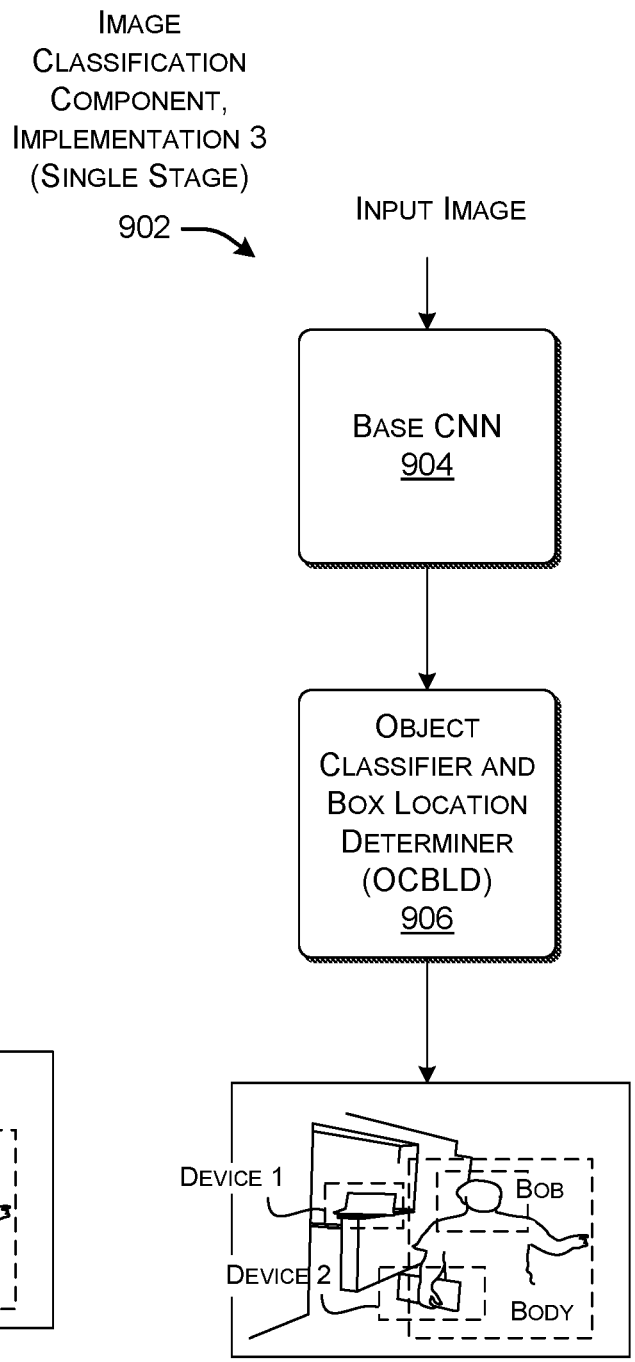
FIG. 8
FIG. 9

Choose Application-Side Filtering Criteria  1304 source(s):

☒ source1
☐ source2
⋮ object type(s)

☒ apparel items
☐ furniture items
⋮ object relations(s):

☒ complementary items
☐ same entity
☐ similar entity (similarity)
⋮ after this date before this date

Choose Presentation Criteria  1306 show duplicates? [N]

arrange by:

☐ time
☒ popularity
⋮

1302

Hint: You can move the dashed-line box to indicate your focus of interest.

OR

Load your own image

1404

1406

SEARCH RESULT IMAGES 1408

You might consider these shirts . . .

1410

1412

1414

. . .

You might consider these shoes . . .

1416    1418    1420   . . .

You might consider these hats . . .

1422    1424    1426   . . .

⋮

1402

Hint: You can move the dashed-line box to indicate your focus of interest.

OR

Load your own image

1506

1504

SEARCH RESULT IMAGES 1508

.... associates with these celebrities

This celebrity ...

1512

See images

See images

See images 1510   1514

1502

GENERATING AND APPLYING AN OBJECT-LEVEL RELATIONAL INDEX FOR IMAGES

BACKGROUND

In current practice, a user may conduct a text-based search or an image-based search. In the latter type of search, the user captures or selects a single composite image and then submits that image as a query to the search engine. The search engine leverages an index to identify one or more candidate images that match the submitted image. More specifically, the index devotes a single entry to each candidate image.

SUMMARY

A computer-implemented technique is described herein for using a machine-trained model to identify individual objects within images. The technique then creates a relational index for the identified objects. That is, each index entry in the relational index is associated with a given object, and includes a set of attributes pertaining to the given object. For instance, one such attribute identifies a latent semantic vector associated with the given object.

Each attribute provides a way of linking the given object to one or more other objects in the relational index. The relational index as a whole may be conceptualized as a graph having nodes (associated with individual objects) connected together by edges (associated with relationships among objects).

The technique also involves performing a search using the relational index. In this process, a user submits a query that specifies a query object. The technique consults the relational index to find one or more objects that are related to the query object. In some cases, the query object and each of the other objects have a complementary relationship, as reflected by the fact that these two objects co-occur in one or more images. For instance, the query object may specify a first item of apparel (e.g., a pair of pants) and the other object may specify a complementary item of apparel (e.g., a shirt).

According to one technical benefit, the technique allows a user to quickly and efficiently identify relevant information by extracting insight from a large corpus of images on a per-object level of granularity.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 shows illustrative computing equipment that can be used to implement the object extraction system of FIG. 1

FIG. 4 shows a set of attributes that the object extraction system of FIG. 1 can extract for each object.

FIG. 5 shows an example of a set of attributes associated with a particular object.

FIGS. 7-9 show three image classification components that can be used in the object extraction system of FIG. 1 to detect objects in images.

FIG. 11 also shows a training system for creating a machine-trained model based on information extracted from the relational index.

Figure 1:
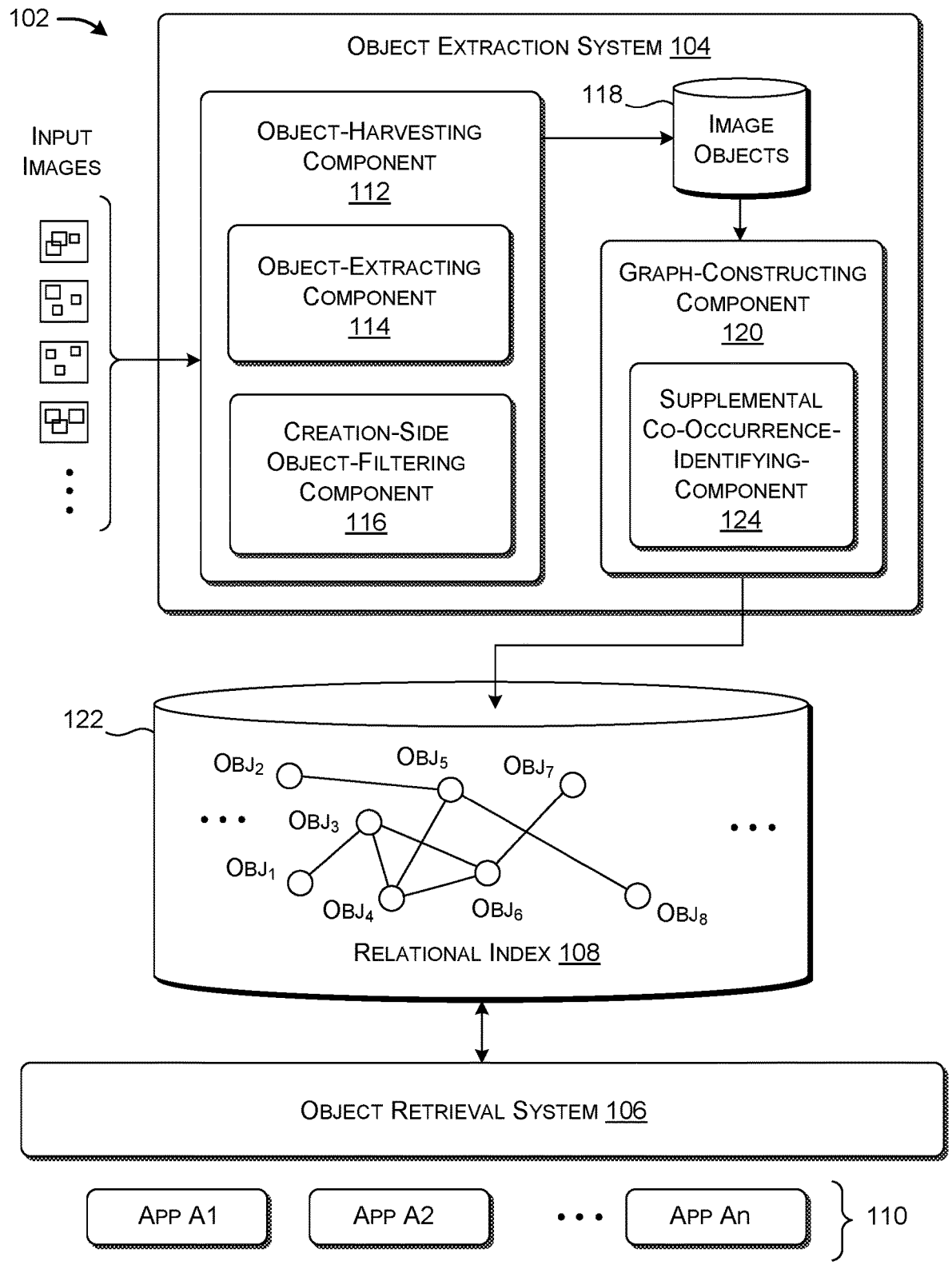
FIG. 1 shows an illustrative computing environment that includes an object extraction system for producing a relational index based on objects that appear in images. The computing environment also includes an object retrieval system for retrieving objects using the relational index.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for generating and applying a relational index for use in retrieving image-related information. Section B sets forth illustrative methods that explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component" and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A. 1. Overview

FIG. 1 shows a computing environment 102 that includes an illustrative object extraction system 104 and an object retrieval system 106. The object extraction system 104 creates a relational index 108 that describes objects extracted from a corpus of input images, along with the images themselves (which constitute objects in their own right). The object retrieval system 106 conducts searches using the relational index 108. For instance, the object retrieval system 106 can receive a query that specifies an object (referred to herein as a "query object"), e.g., by submitting an image that shows the query object. In response, the object retrieval system 106 uses the relational index 108 to find one or more other objects that are linked to the query object. The object retrieval system 106 may expose an application programming interface (API) or other type of interface. One or more applications 110 perform various functions that involve querying the relational index via the object retrieval system 106.

This subsection provides an overview of the computing environment 102. Subsection A. 2 provides additional illustrative details regarding the object extraction system 104. Subsection A. 3 provides additional details regarding the object retrieval system 106.

Referring first to the object extraction system 104, an object-harvesting component 112 performs the initial task of receiving images from one or more image sources. The object-harvesting component 112 can receive the images using a push-based technique (in which the sources independently forward the images to the object-harvesting component 112), a pull-based technique (in which the object-harvesting component 112 pulls the images from the sources), or a combination thereof. In one pull-based implementation, the object-harvesting component 112 uses an existing image-based search engine to retrieve images from the Internet or other wide area network, without discriminating among different kinds of image content. The existing image-based engine performs this task using an image index that identifies images on an image-level granularity, e.g., by devoting an index entry per image. In another approach, the object-harvesting component 112 uses the existing image-based search engine to access images accessible over a wide area network (e.g., the Internet) that meet specified search criteria. For instance, the object-harvesting component 112 can use a search engine to collect images that pertain to one or more specified themes. For example, the object-harvesting component 112 can receive images pertaining to fashion by submitting fashion-related search queries to the search engine.

An object-extracting component 114 identifies the object(s) present in each image. The object-extracting component 114 can use any machine-trained classification model(s) to perform this task. Section A. 2, for instance, describes three illustrative kinds of neural networks for performing this task. By way of overview, a multiclass classification model can be trained to detect any set of objects in the images, such as people, specific faces, animal species, natural landscape features, buildings, products, etc. In addition, a classification model can be trained to detect actions depicted in the images, such as "running," "swimming," "pointing," etc. More specifically, some classification models identify the probability that an image contains particular kinds of objects without estimating the locations of these objects in the image. Other classification models identify both the presence and locations of the objects in the image, e.g., by specifying bounding boxes, object masks, etc.

A creation-side object-filtering component 116 optionally removes detected objects (and relationships among objects) that fail to meet one or more tests. Section A. 2 describes different types of filtering components that serve this role. For example, a quality-filtering component excludes objects that fail to meet various quality-related criteria.

In one implementation, the object-harvesting component 112 expresses the results of its analysis on each object as a set of attributes. The object-harvesting component 112 then stores these results in a data store 118. As used herein, an "attribute" refers to an attribute variable (e.g., location) coupled with an attribute value (e.g., "Italy"). The attributes include information regarding the classification of the object (referred to herein as entity information), as well as the location of the object in the image (if known). The object-extracting component 114 can classify an object in different levels of specificity. In one case, for instance, the object-extracting component 114 identifies an image of an entity showing a building as a "house." Alternatively, or in addition, the object-extracting component 114 identifies a specific type of entity in an image, such as the "White House." The object-extracting component 114 can describe the location of each object by specifying the location of its enclosing bounding box, or by specifying its mask, etc. Optionally, the object-extracting component 114 can also store the image content associated with the object itself, e.g., corresponding to the pixel content enclosed by the bounding box associated with the object.

The object-harvesting component 112 can also compute at least one latent semantic vector associated with each object. It then stores the latent semantic vector(s) as another attribute associated with the object. In one implementation, the object-harvesting component 112 can compute each latent semantic vector by using a deep neural network (DNN), such as the kind of convolutional neural network (CNN) described below in connection with FIG. 10. The CNN maps a region of the image associated with an object into a feature-space representation of the region, corresponding to a latent semantic vector. The latent semantic vector corresponds to a distributed representation of the meaning of the object.

The object-harvesting component 112 can store yet other attributes regarding each object. The attributes can include: the parent object (if any) with which an object is associated; the image with which the object is associated; the web page (if any) with which the object is associated; the entity with which the object is associated; the time at which the image associated with the object was captured; the location at which the image associated with the object was captured, and so on. This list is extensible; as such, different environments can store a different set of attributes to serve their respective end-use objectives.

A graph-constructing component 120 assembles the object information stored in the data store 118 into the relational index 108, which it stores in another data store 122. It performs this task by allocating an index entry to each object. The index entry may be conceptualized as a node in a graph. The graph-constructing component 120 also allocates an object to each composite image from which objects were extracted. The graph-constructing component 120 also allocates an object to each web page from which one or more images were extracted. As such, some index entries in the relational index 108 represent objects that have no component child objects, while other index entries represent composite objects that encompass two or more child objects.

The relational index 108 also includes a set of edges (links) that connect the objects together. In some cases, for instance, an object includes one or more attributes that explicitly point to one or more other objects. For instance, an object may include a first attribute that indicates that it belongs to a parent object within an image. It may include a second attribute that indicates that it belongs to particular image. And it may include a third object that identifies that it ultimately originates from a particular web page. Each such attribute defines a link between two objects.

An object may include other attributes that do not expressly point to other objects, but which establish a *nexus* with one or more objects that share the same attributes (or, more specifically stated, that share the same attribute values for the same attribute variables). For instance, a first object in a first image may have a latent semantic vector that matches a latent semantic vector associated with a second object in a second image, within some environment-specific threshold of proximity ($\lambda_1$). The first object may be said to be linked to the second object because they both have the same latent semantic vector, and are thus considered identical entities. Alternatively, the first object may be linked to the second object by virtue of a link that describes similar objects; this is true when the distance between their two latent semantic vectors is greater than the first threshold ($\lambda_1$) but less than a second threshold ($\lambda_2$). An application can define distance between two vectors using any distance metric, such as cosine similarity, Euclidean distance, etc.

In other cases, the first and second objects may be considered linked because they originate from images that were captured at the same time. In other cases, the first and second objects may be considered linked because they originate from images that were captured at the same location. In still other cases, the objects may be considered linked because they are associated with the same entity, even though their semantic vectors may not be close together in semantic vector space.

In some implementations, the graph-constructing component 120 does not allocate a separate data item to represent a link between objects. Rather, in this case, the graph-constructing component 120 uses the attributes of the objects themselves to designate the links. In other implementations, the graph-constructing component 120 can include explicit data items that designate links.

Note that the relational index 108 implicitly stores information that an application can use to investigate the co-occurrence of objects within images. For instance, an application can conclude that two objects co-occur in the same image when they both link to the same parent object. If they co-occur in the parent object, they also inherently co-occur in the same image. In other cases, an application can conclude that two objects co-occur because they appear in the same image, although they do not belong to the same parent object. In other cases, an application may conclude that the objects co-occur because they both originate from images in the same web page, even though they do not originate from the same image on that web page.

An optional co-occurrence-identifying component 124 can add additional links to the relational index 108 to indicate additional associations between objects. Consider, for example, the case in which an image shows a man standing next to a landmark, such as a historic building. The object extraction system 104 automatically links the man object to the historic building object by virtue of the fact that the man and the historic building are both depicted in the same image. But the object extraction system 104 will not automatically link the man object to the historic building object as a semantic unit. This handling of the object is proper when the man is a tourist who is visiting the historic building on vacation; the man otherwise has no deep *nexus* to the historic building. But next consider the case in which the man is the caretaker of the historic building. In this case, the man may be considered a veritable fixture of the historic building itself. The co-occurrence-identifying component 124 identifies cases such as these and memorializes them with additional object attributes. For example, the co-occurrence-identifying component 124 can add an attribute to the man object that points to the historic building object, or vice versa. The co-occurrence-identifying component 124 can make this assessment based on statistical information, e.g., when it observes that the same man appears next to the historic building in more than a prescribed number of images.

To provide another example, an image may show two people. Again, the objects associated with these two people co-occur because they appear together in at least one image. But these people might be strangers, and the image might have captured them together by mere coincidence. The link between these two objects is therefore shallow. On the other hand, these people may be close friends or partners in marriage. The co-occurrence-identifying component 124 can make this assessment when it observes that these two people appear together in more than a prescribed number of images. In that case, it can add an attribute to both objects that point to each other. The co-occurrence-identifying component 124 is said to be "supplemental" because it captures relationships beyond that identified by the object-extracting component 114.

Further note that the graph-constructing component 120 can store information in the relational index 108 in a resource-efficient manner. For example, the relational index 108 may include a page-level index entry that links to an image-level index entry to memorialize the fact that a corresponding image appears on a particular web page. The image-level index entry, in turn, may link to one or more parent-level index entries. Each parent-level index entry, in turn, may link to one or more child-level index entries, and so on. The graph-constructing component 120 can store information regarding this chain of objects in such a manner that avoids duplicating information. For example, the graph-constructing component 120 can store attributes for the image-level index-entry that indicate the time and location at which the corresponding image was created. Each child object that links to this image object inherits these attributes without necessarily duplicating this information.

A user who interacts with the object retrieval system 106 may submit a search query that specifies a query object and a relationship-of-interest. Based on this query, the object retrieval system 106 leverages the relational index 108 to find related objects. For example, assume that the object-of-interest is a shirt, and the user specifies that she is interested in finding complementary items of apparel to the shirt. The object retrieval system 106 can return a set of pants, hats, shoes, etc. that are linked to shirt. More specifically, these complementary objects are linked to the shirt because they have appeared in one or more images with the shirt. In other cases, the user may be interested in just finding images in which the shirt occurs. In still other cases, the user may be interested in finding images for shirts that are similar to the specified shirt, but not the same. The user may mine yet additional relationships among objects specified in the relational index 108.

Figure 2:
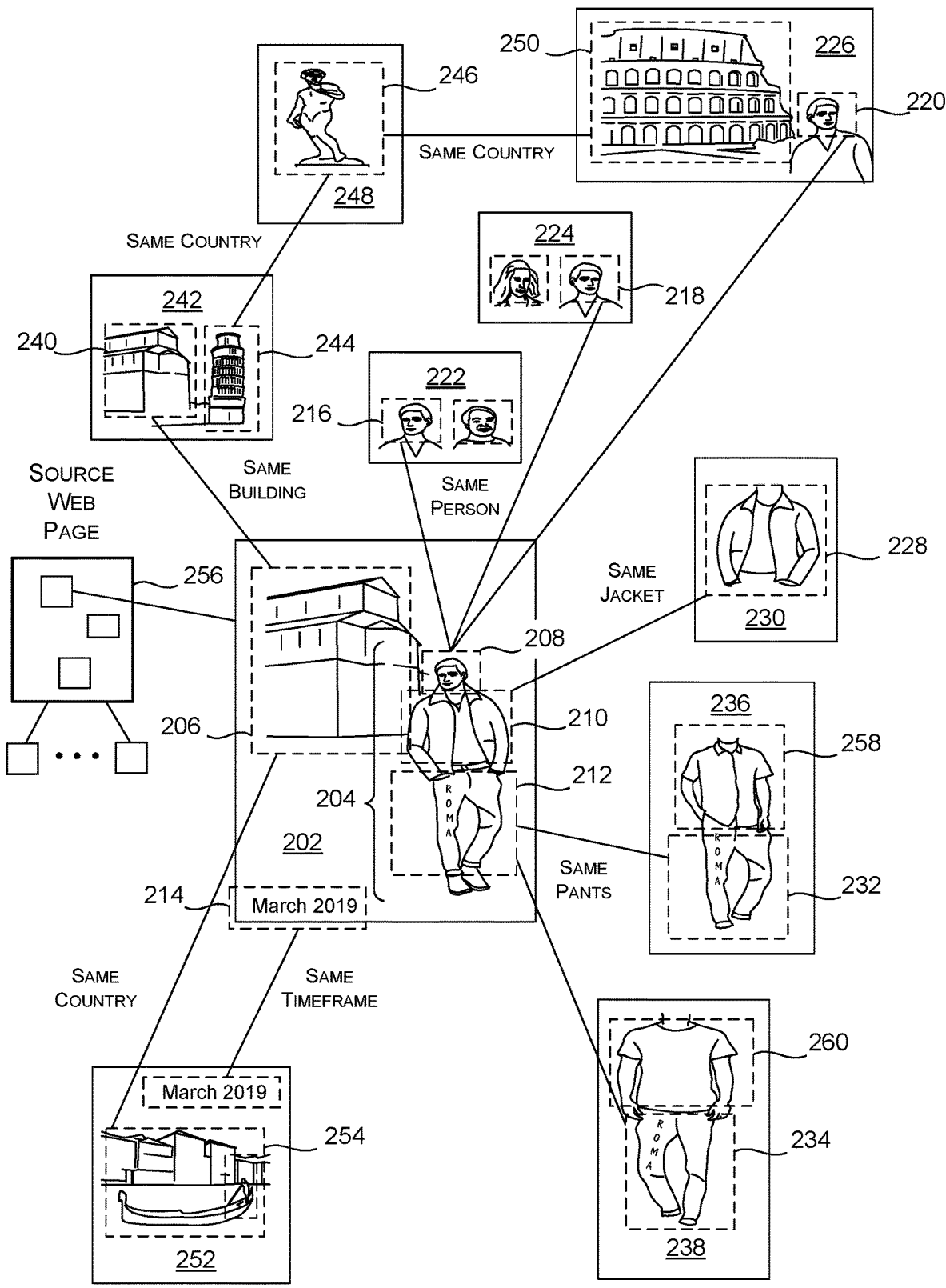
FIG. 2 shows an example of objects (and relationships among objects) that can be identified by the object extraction system of FIG. 1.

FIG. 2 shows an example of some of the relationships that may link an illustrative image 202 to other images and associated objects. In this merely illustrative case, the image 202 shows a celebrity standing beside Pisa Cathedral in Pisa Italy. The object-extracting component 114 identifies multiple objects in this image 202, including a person object 204 and a Pisa Cathedral object 206. The object-extracting component 114 also determines that the person object 204 is composed of plural component objects. For instance, the object-extracting component 114 uses face recognition technology to recognize an identity of the person (if possible), to provide a face object 208. The face recognition technology may perform this task by comparing a latent semantic vector associated with the face of the person with previously stored vectors associated with known faces. The object-extracting component 114 also identifies a jacket object 210 and a pants object 212, associated with a recognized jacket and pair of pants, respectively. More generally, the object-harvesting component 112 extracts a full set of attributes for each such object in the image 202, including a latent semantic vector, bounding box information, entity information, etc. FIG. 2 shows time information 214, which may correspond to Exchangeable image file format (Exif) metadata. A digital camera associates the time information 214 with the image 202 at the time of capture.

In this merely illustrative example, assume that the face object 208 is linked to face objects (216, 218, 220) in at least three other images (222, 224, 226) in which the same person appears. For instance, the face object 208 in the image 202 may be linked with the face objects (216, 218, 220) in the images (222, 224, 226) because the face object 208 has a latent semantic vector that is within a threshold distance of each such other face object.

Similarly, the jacket object 210 in the image 202 is linked to the same jacket object 228 in an image 230. The pants object 212 in the image 202 is linked to the same respective pants objects (232, 234) in images 236 and 238. The building object 206 is linked to the same building object 240 in an image 242. The image 242, in turn, includes another building object 244 that is linked to a statue object 246 in an image 248 by virtue of the fact that they both share the same capture location (that is, because they were both taken in the country of Italy). Likewise, the statue object 246 is linked to another building object 250 in the image 226 because they both pertain to the same country. The image 202 is linked to an image 252 by virtue of the fact that these images were taken at the same time. The image 202 is also linked to the image 252 because the building object 206 (in image 202) and a cityscape object 254 (in the image 252) pertain to the same country (Italy). Finally, the image 202 includes a link that indicates that it originates from a particular web page 256. As shown, that web page 256 includes plural images, including the image 202.

Note that some of the objects shown in FIG. 2 are correlated by virtue of the fact that they originate from the same parent object. For example, the pants object 232 in image 236 is linked to a shirt object 258 by virtue of that the fact that they belong to the same person. Similarly, the pants object 234 in image 238 is linked to the shirt object 260 by virtue of the fact that they belong to the same person. This provides one kind of relationship that the object retrieval system 106 can leverage to extract complementary objects from the relational index 108, given a specified query object (such as a query object that specifies the pants object 212).

FIG. 3 shows computing equipment 302 that can be used to implement the computing environment 102 of FIG. 1. The computing equipment 302 includes one or more servers 304 coupled to one or more user computing devices 306 via a computer network 308. The user computing devices 306 can correspond to any of: desktop computing devices, laptop computing devices, handheld computing devices of any types (smartphones, tablet-type computing devices, etc.), mixed reality devices, game consoles, wearable computing devices, intelligent Internet-of-Thing (IoT) devices, and so on. Each user computing device (such as representative user computing device 310) includes local program functionality (such as representative local program functionality 312). The computer network 308 may correspond to a wide area network (e.g., the Internet), a local area network, one or more point-to-point links, etc., or any combination thereof.

The functionality of the computing environment 102 can be distributed between the servers 304 and the user computing devices 306 in any manner. In one implementation, the servers 304 implement all functions of the computing environment 102. In that scenario, the user may interact with the functionality of the object retrieval system 106 via a browser program provided by a user computing device. In another implementation, each user computing device implements some of the functions shown in FIG. 1, while the servers 304 implement other functions. For example, each user computing device can implement at least some user interface functions of the object retrieval system 106; the servers 304 can implement the remainder of the functions shown in FIG. 1.

A. 2. The Object Extraction System

FIG. 4 shows a set of attributes that the object extraction system 104 of FIG. 1 can extract for each object. In one non-limiting implementation, the objects can include an object ID; at least one latent semantic vector; a parent object ID that identifies a parent object (if any) associated with the object; an image ID that identifies an image in which the object is included; a page ID that identifies a web page or other source document in which the object's image is included; a time at which the image was captured; a location in which the image was captured; an entity associated with the object, etc. Note that any object may include an attribute by inheriting it from a parent object; in this circumstance, there is no requirement that object store a duplicate copy of the attribute.

FIG. 5 shows an illustrative set of attributes associated with the jacket object 210 shown in FIG. 2. Note that the jacket object 210 includes a parent object ID that indicates that it belongs to the parent person object 204.

Figure 6:
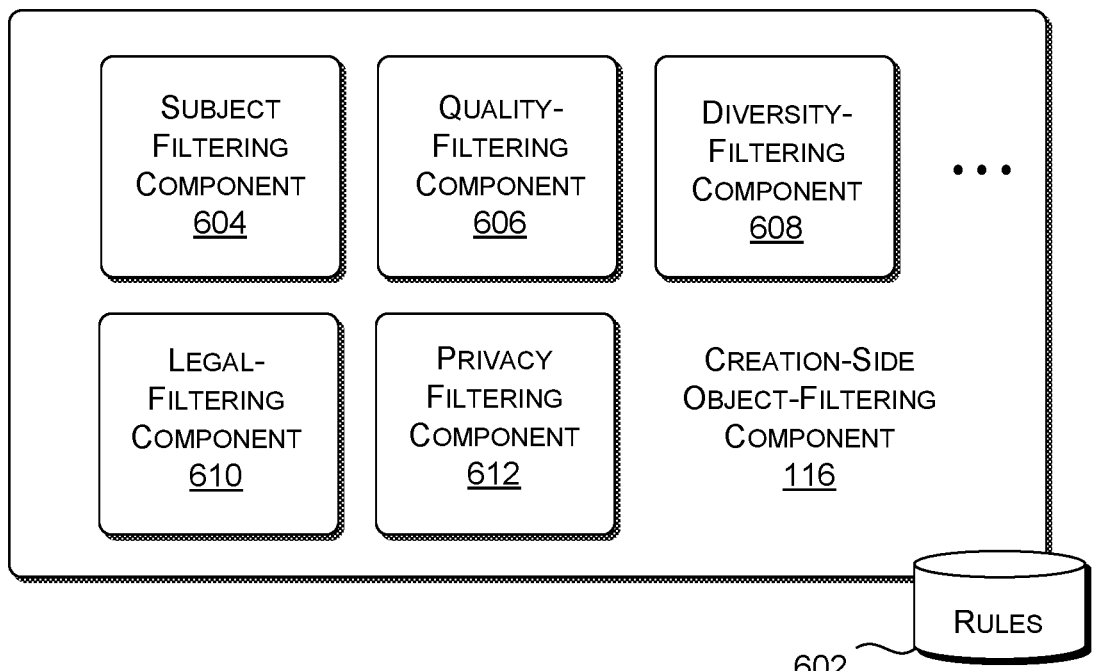
FIG. 6 shows a creation-side object-filtering component that can be used by the object extraction system of FIG. 1 to control the kinds of objects added to the relational index.

FIG. 6 shows a more detailed depiction of the creation-side object-filtering component 116. As described above, the creation-side object-filtering component 116 can eliminate any object identified by the object-extracting component 114 that fails to meet various tests. Alternatively, or in addition, the creation-side object-filtering component 116 can modify the attributes associated with an object, e.g., by removing a link that associates the object with another object. The object-filtering component 116 includes a set of subcomponents that perform different functions. In some cases, each subcomponent may operate based on a discrete set of rules provided in a data store 602. Alternatively, or in addition, each subcomponent may operate using a machine-trained model.

A subject-filtering component 604 can remove objects that correspond to one or more classes of non-permitted objects. Each application environment can define what constitutes a non-permitted object. For instance, some environments may exclude objects that show particular kinds of people (e.g., private individuals as opposed to public figures, children, etc.). The subject-filtering component can operate by comparing the object type information and face recognition information provided by the object-extracting component to a whitelist that defines permitted objects; the subject-filtering component 604 can exclude any object having an object type or user identity that does not appear on the whitelist.

A quality-filtering component 606 excludes objects that do not meet one or more prescribed quality-related tests. For instance, in the fashion-related domain, the quality-filtering component 606 can use a machine-trained classification model to discriminate between catalogue-quality images of apparel and personal photographs of people. It can exclude personal photographs, unless these photographs sufficiently resemble catalogue images. Another machine-trained model can identify objects that are occluded or clipped, etc. A training system (not shown) can train these kinds of classification models based on a corpus of training images that are tagged as having either good quality or bad quality. Alternatively, or in addition, the quality-filtering component 606 can apply discrete measures (e.g., a signal-to-noise measure) to eliminate substandard objects. Alternatively, or in addition, the quality-filtering component 606 can determine whether to retain an object based on its source (e.g., based on the website from which its corresponding object was obtained).

A diversity-filtering component 608 can remove objects based on various diversity-related considerations. For example, the diversity-filtering component 608 can remove duplicate objects in those situations in which these objects do not contribute any new information to the relational index. For instance, assume that the jacket object 210 in FIG. 2 is linked to many other jacket objects that are identical to the jacket object 228 (e.g., because their latent semantic vectors are the same, with respect to an environment-specific tolerance threshold). The diversity-filtering component 608 can exclude all or some of these redundant objects in the relational index 108, as the redundant objects do not convey any more information beyond the jacket object 228. But even when pruning the relational index 108 in this manner, the diversity-filtering component 608 can retain statistical information that identifies the commonality of objects and relations in the relational index 108. These provisions make the relational index 108 more efficient.

A legal-filtering component 610 and privacy-filtering component 612 can remove any objects based on the laws and/or norms of a particular jurisdiction. The privacy-filtering component 612 can also blur various objects to protect the privacy of users, such as faces, personal information, etc. The data store 602 can include rules that define what objects types should be excluded or blurred.

On the more general topic of privacy, the computing environment 102 can include various provisions to protect the privacy of individuals. In one such option, the computing environment 102 allows individual end users to explicitly authorize the computing environment 102 to collect images that they have captured themselves and/or in which they are depicted. The computing environment 102 then allows the users to rescind such authorizations; upon this event, the computing environment 102 will remove index items for images submitted by the user and/or in which the user is depicted. According to another provision, the object extraction system 104 can use a wide range of publically-available images of various types to identify relationships among objects. For instance, the object extraction system 104 can use both catalogue images and user photographs to determine the correlations among different apparel items. But once having learned the relationships among apparel items, the object retrieval system 106 will display only catalogue images associated with the apparel items. Alternatively, or in addition, it can only display images submitted by users who have explicitly opted to participate in the service provided by the computing environment 102.

FIGS. 7-10 show three respective implementations of the object-extracting component 114. Each implementation uses a classification component to identify the entity(ies) within an image, to thus provide entity information. Some implementations also identify the locations of those entities within the image.

Figure 7:
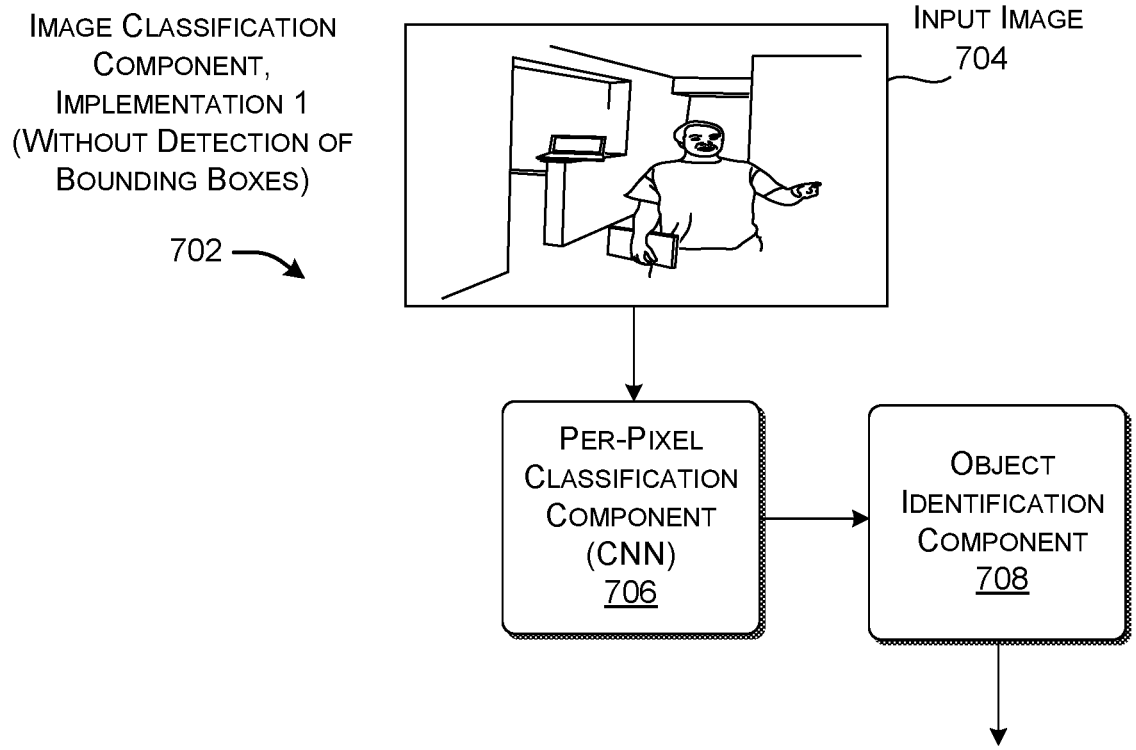

Starting with FIG. 7, this figure shows an image classification component 702 that recognizes objects in an input image, but without also identifying the locations of those objects. For example, the image classification component 702 can identify that an input image 704 contains at least one person and at least one computing device, but does not also provide bounding box information that identifies the locations of these objects in the image. In one implementation, the image classification component 702 includes a per-pixel classification component 706 that identifies the object that each pixel most likely belongs to, with respect to a set of possible object types (e.g., a dog, cat, person, etc.). The per-pixel classification component can perform this task using a convolutional neural network (CNN). An object identification component 708 uses the output results of the per-pixel classification component 706 to determine whether the image contains at least one instance of each object under consideration. The object identification component 708 can make this determination by generating a normalized score that identifies how frequently pixels associated with each object under consideration appear in the input image. General background information regarding one type of pixel-based object detector may be found in Fang, et al, "From Captions to Visual Concepts and Back," arXiv:1411.4952v3 [cs.CV], Apr. 14, 2015, 10 pages.

Advancing to FIG. 8, this figure shows a second image classification component 802 that uses a dual-stage approach to determining the presence and locations of objects in the input image. In the first stage, a ROI determination component 804 identifies regions-of-interest (ROIs) associated with respective objects in the input image. The ROI determination component 804 can rely on different techniques to perform this function. In a selective search approach, the ROI determination component 804 iteratively merges image regions in the input image that meet a prescribed similarity test, initially starting with relatively small image regions. The ROI determination component 804 can assess similarity based on any combination of features associated with the input image (such as color, brightness, hue, texture, etc.). Upon the termination of this iterative process, the ROI determination component 804 draws bounding boxes around the identified regions. In another approach, the ROI determination component 804 can use a Region Proposal Network (RPN) to generate the ROIs. In a next stage, a per-ROI object classification component 806 uses a CNN or other machine-trained model to identify the most likely object associated with each ROI. General background information regarding one illustrative type of dual-stage image classification component may be found in Ren, et al., "Faster R-CNN: Towards Real-Time Object Detection with Region Proposal Networks," arXiv:1506.01497v3 [cs.CV], Jan. 6, 2016, 14 pages.

FIG. 9 shows a third image classification component 902 that uses a single stage to determine the presence and locations of objects in the input image. First, this image classification component 902 uses a base CNN 904 to convert the input image into an intermediate feature representation ("feature representation"). It then uses an object classifier and box location determiner (OCBLD) 906 to simultaneously classify objects and determine their respective locations in the feature representation. The OCBLD 906 performs this task by processing plural version of the feature representation having different respective scales. By performing analysis on versions of different sizes, the OCBLD 906 can detect objects having different sizes. More specifically, for each version of the representation, the OCBLD 906 moves a small filter across the representation. At each position of the filter, the OBCLD 906 considers a set candidate bounding boxes in which an object may or may not be present. For each such candidate bounding box, the OCBLD 906 generates a plurality of scores, each score representing the likelihood that a particular kind of object is present in the candidate bounding box under consideration. A final-stage suppression component uses non-maximum suppression to identify the most likely objects contained in the image along with their respective bounding boxes. General background information regarding one illustrative type of single-stage image classification component may be found in Liu, et al., "SSD: Single Shot MultiBox Detector," arXiv:1512.02325v5 [cs.CV], Dec. 29, 2016, 17 pages.

In yet another approach (not shown), a classification component can determine the classification of a particular object by computing a latent semantic vector ("query latent semantic vector") based on the image content associated with the object. It can then use this query latent semantic vector to find one or more matching images in a data store of reference images. These matching images correspond to images having latent semantic vectors that are within a prescribed distance of the query latent semantic vector. In one implementation, the classification component can find these nearby latent semantic vectors using an approximate nearest neighbor (ANN) technique. Assume that each such reference image in the data store is annotated with label information or keyword information that describes its classification. The classification component can extract this textual information for the identified matching image(s) to provide the classification of the object under consideration. In brief, this classification model leverages a retrieval operation as a proxy for a classification operation. Like the three examples described above, this classification component may be said to use a machine-trained model by virtue of its use of a machine-trained model to generate a latent semantic vector.

One or more other classification models can be trained to detect particular kinds of objects. For example, a machine-trained face recognition model can use a CNN to determine the identities of people depicted in images based on images of their faces.

Figure 10:
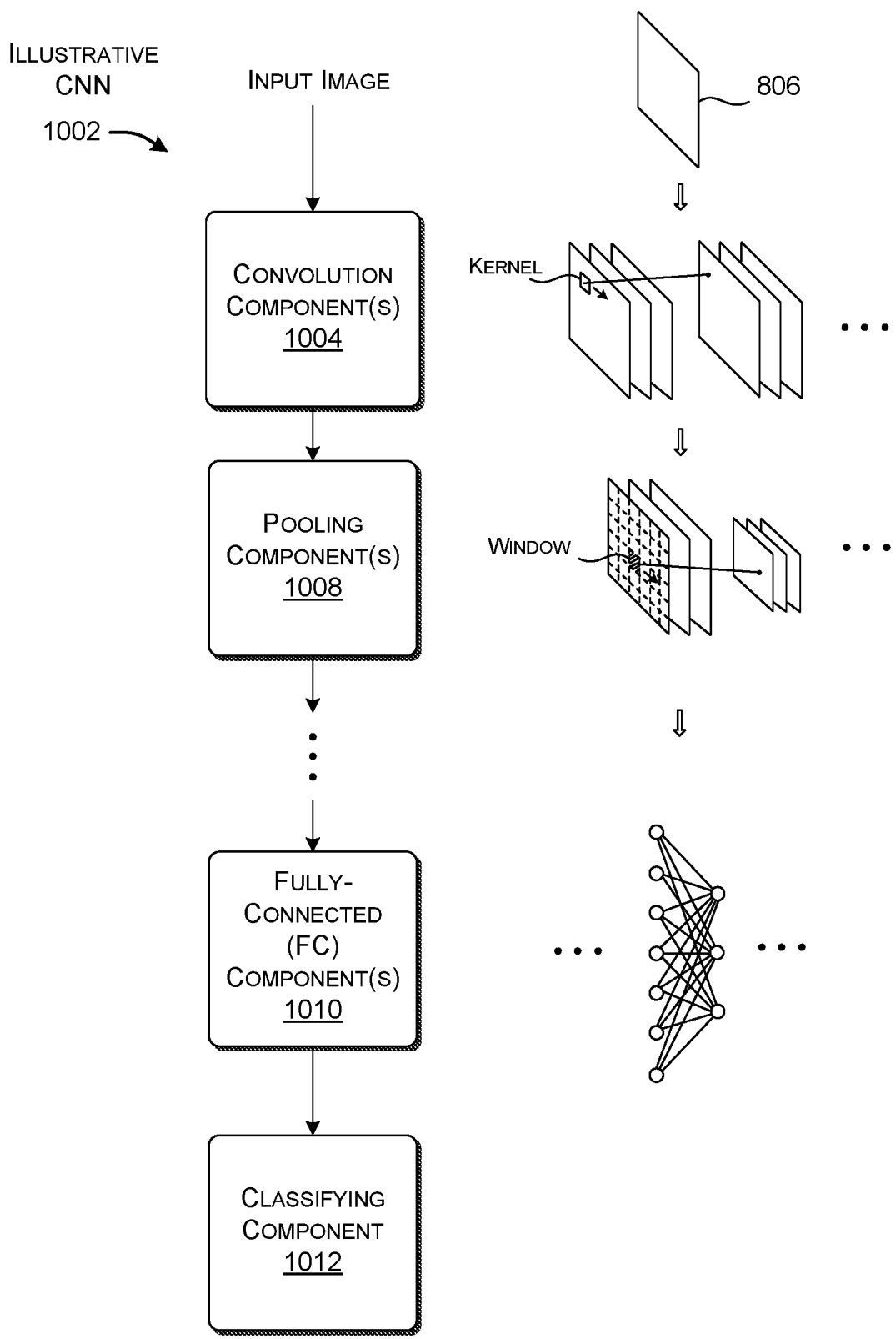
FIG. 10 shows an illustrative convolutional neural network (CNN) that can be used to implement aspects of the image classification components of FIGS. 7-9.

FIG. 10 shows a convolutional neural network (CNN) 1002 that can be used to implement various parts of the above-described classification components. The CNN 1002 performs analysis in a pipeline of stages. One of more convolution components 1004 perform a convolution operation on an input image 1006. One or more pooling components 1008 perform a down-sampling operation. One or more fully-connected components 1010 respectively provide one or more fully-connected neural networks, each including any number of layers. More specifically, the CNN 1002 can intersperse the above three kinds of components in any order. For example, the CNN 1002 can include two or more convolution components interleaved with pooling components. In some implementations, the CNN 1002 can include a classification component 1012 that outputs a classification result based on feature information provided by a preceding layer. For example, the classification component 1012 can correspond to a Softmax component, a support vector machine (SVM) component, etc.

In each convolution operation, a convolution component moves an n×m kernel (also known as a filter) across an input image (where "input image" in this general context refers to whatever image is fed to the convolutional component). In one implementation, at each position of the kernel, the convolution component generates the dot product of the kernel values with the underlying pixel values of the image. The convolution component stores that dot product as an output value in an output image at a position corresponding to the current location of the kernel. More specifically, the convolution component can perform the above-described operation for a set of different kernels having different machine-learned kernel values. Each kernel corresponds to a different pattern. In early layers of processing, a convolutional component may apply kernels that serve to identify relatively primitive patterns (such as edges, corners, etc.) in the image. In later layers, a convolutional component may apply kernels that find more complex shapes.

In each pooling operation, a pooling component moves a window of predetermined size across an input image (where the input image corresponds to whatever image is fed to the pooling component). The pooling component then performs some aggregating/summarizing operation with respect to the values of the input image enclosed by the window, such as by identifying and storing the maximum value in the window, generating and storing the average of the values in the window, etc.

A fully-connected component can begin its operation by forming a single input vector. It can perform this task by concatenating the rows or columns of the input image (or images) that are fed to it, to form a single input vector. The fully-connected component then feeds the input vector into a first layer of a fully-connected neural network. Generally, each layer j of neurons in the neural network produces output values $z_j$ given by the formula $z_j = f(W_j z_{j-1} + b_j)$, for j=2, ... N. The symbol j−1 refers to a preceding layer of the neural network. The symbol $W_j$ denotes a machine-learned weighting matrix for the layer j, and the symbol $b_j$ refers to a machine-learned bias vector for the layer j. The activation function $f(\cdot)$ can be formulated in different ways, such as a rectified linear unit (ReLU).

Consider the particular context in which the CNN 1002 receives a portion of an image associated with a particular object, such as the pixels enclosed by a bounding box associated with the object. The output of the fully-connected component(s) 1010 may be considered a latent semantic vector associated with an object. That vector provides a distributed representation of the meaning associated with the object. In this regard, the object-harvesting component 112 can leverage the CNN 1002 to generate an attribute for each object under consideration that identifies a latent semantic vector associated with the object.

A. 3. Object Retrieval System

Figure 11:
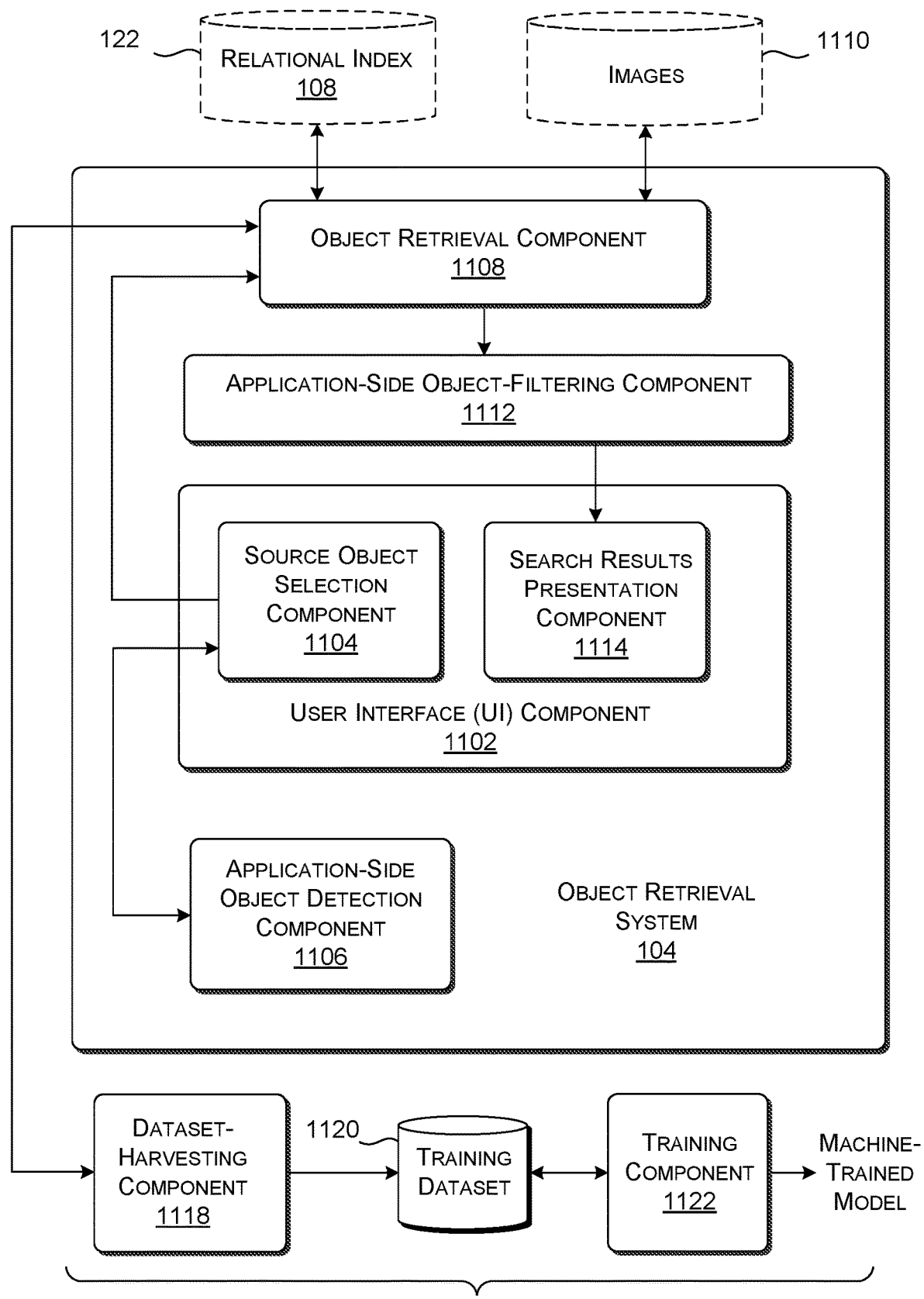
FIG. 11 shows one illustrative implementation of the object retrieval system shown in FIG. 1.

FIG. 11 shows one illustrative implementation of the object retrieval system 106. The object retrieval system 106 allows a user to extract information using the relational index 108, given a query object submitted by the user.

The object retrieval system 106 includes a user interface (UI) component 1102 that allows a user to interact with the object retrieval system 106. More specifically, the UI component 1102 includes a source object selection component 1104 that allows a user to specify a query object. In one case, a user specifies a query object by selecting it within a large collection of images. For instance, assume that a user is currently viewing a web page that includes plural images, each depicting a single object. The user can select a query object by clicking on one of the images. Or the user can capture and load a new image that depicts an object. In yet another case, a user may specify an object by typing in alphanumeric information that identifies the object or otherwise selecting this alphanumeric information. For example, the user can select a jacket object by entering the product name of this jacket object as a query object.

In yet another case, assume that an image contains two or more objects. The user can select an object in the image by selecting a portion of an image associated with the image. For instance, the user can click on a point in the image associated with the object. Or the user can adjust a bounding box such that it encompasses the object.

An application-side object-extracting component 1106 performs the same role as the creation-side object-extracting component 114. That is, the application-side object-extracting component 114 can use any classification component shown in FIGS. 7-9 to detect the kind of object designated by the user, identify a latent semantic vector associated with the object, and so on. More generally, the application-side object-extracting component 1106 can extract a set of attributes associated with each image, or each object designated within an image. In other cases, a user may select an object for which attributes have already been identified and stored in the relational index 108 (e.g., in an offline extraction process).

An object retrieval component 1108 uses the query object to identify one or more other objects that are linked to the query object, as specified by the relational index 108. In one implementation, the object retrieval component 1108 performs this task by first locating an index entry associated with the query object in the relational index 108 (if it exists). For example, the object retrieval component 1108 can use one or more attribute(s) extracted by the application-side object detection component 1106 for the query object (or previously-provided attribute(s) associated with the query object) to find a node in the relational index 108 that corresponds to the query object, with an environment-specific degree of tolerance. It then identifies other objects that are linked to the query object, with respect to the kind of relationship (edge type) specified by the user. For instance, if the user is interested in identifying objects that have a complementary relationship to the query object, it traces appropriate edges in the relational index 108 associated with object co-occurrences to find related objects. In another implementation, the object retrieval component 1108 uses the attribute(s) extracted by the application-side object detection component 1106 for the query object (or previously-provided attribute(s) associated with the query object) to directly find related objects in the relational index 108, e.g., without first attempting to find a preexisting counterpart node in the relational index 108 associated with the query object.

Upon finding a related object in the above manner, the object retrieval component 1108 can retrieve image information associated with the identified object from a data store 1110 (which may correspond to a dedicated data store or the distributed resources associated with the Internet). In one implementation, the data store 1110 stores the actual images processed by the object extraction system 104 in its generation of the relational index 108. For instance, assume that the object extraction system 104 extracts a particular object (say a jacket object) from a particular public image X; the data store 1110 will store this same image X. In another case, the data store 1110 contains proxy images, such as a catalogue images or some other kind of curated collection of images.

For instance, the data store 1110 can use a catalogue image X' in place of the above-described public image X that was actually used by the object extraction system 104 to detect the jack object. It then displays this catalogue image X' in lieu of the image X.

An optional application-side object-filtering component 1112 can provide any of the filtering operations performed by the creation-side object-filtering component 116. But the application-side object-filtering component 1112 can apply a ruleset and/or machine-trained model that are customized to suit the objectives of a particular application. For instance, in a shopping-related context, the application-side object-filtering component 1112 can cluster the retrieved objects into one or more groups, and then select one or more representative objects from each cluster to present to the user. This provision improves the diversity of items presented to the user. The application-side object-filtering component 1112 can perform this task by using any type of clustering technology (e.g., k-mean clustering) to form groups of latent semantic vectors in semantic vector space. It can then select one or more images from this group that have the best quality, as assessed by a quality-filtering component.

A results presentation component 1114 presents the objects identified by the object retrieval system 106. The results presentation component 1114 can use any presentation strategy to perform this task, such as by presenting an array of images associated with the identified objects. In addition, the results presentation component 1114 can display edges that connect the query object to the identified related objects. The results presentation component 1114 can also annotate the edges with labels to describe what kinds of relationships the edges depict. Alternatively, or in addition, the results presentation component 1114 can present alphanumeric information that describes the related objects, such as by providing a list of text snippets that describe the related objects.

FIG. 11 also shows a training system 1116 for creating a machine-trained model based on information extracted from the relational index 108. The training system 1116 includes a dataset-harvesting component 1118 for extracting related pairs of images. It performs this task by submitting query objects to the object retrieval component 1108 and receiving related objects in response thereto. For instance, the dataset-harvesting component 1118 can submit a query object to the object retrieval component 108 that shows a shirt object. Assume that the object retrieval component 1108 returns an image that shows the shirt object together with a complementary pants object. In other words, the object retrieval component 1108 identifies at least one image in which the shirt object co-occurs with the pants object. The pairing of the shirt object and the pants object constitutes a single positive training example. The dataset-harvesting component 1118 can generate negative training examples by randomly pairing objects together (with the assumption that these objects will not be correlated). The dataset-harvesting component 1118 stores the training examples in a data store 1120.

A training component 1122 then trains a machine-trained model based on the training examples in the data store 1120. It can perform this task using any machine-learning technique, such as Stochastic Gradient Descent, etc. More specifically, in one case, the training component 1122 can train a model that predicts a complementary object ID given an input query object ID or an input image that shows the query object itself. In another case, the training component 1122 trains a generative model that synthesizes a complementary object image based on a specified query object. This object is synthetic in the sense that there is no expectation that it matches a real preexisting image in the data store 1110. The object retrieval system 106 can then retrieves a "real" preexisting image from the data store 1110 that matches the generated image, within a prescribed degree of tolerance.

Figure 12:
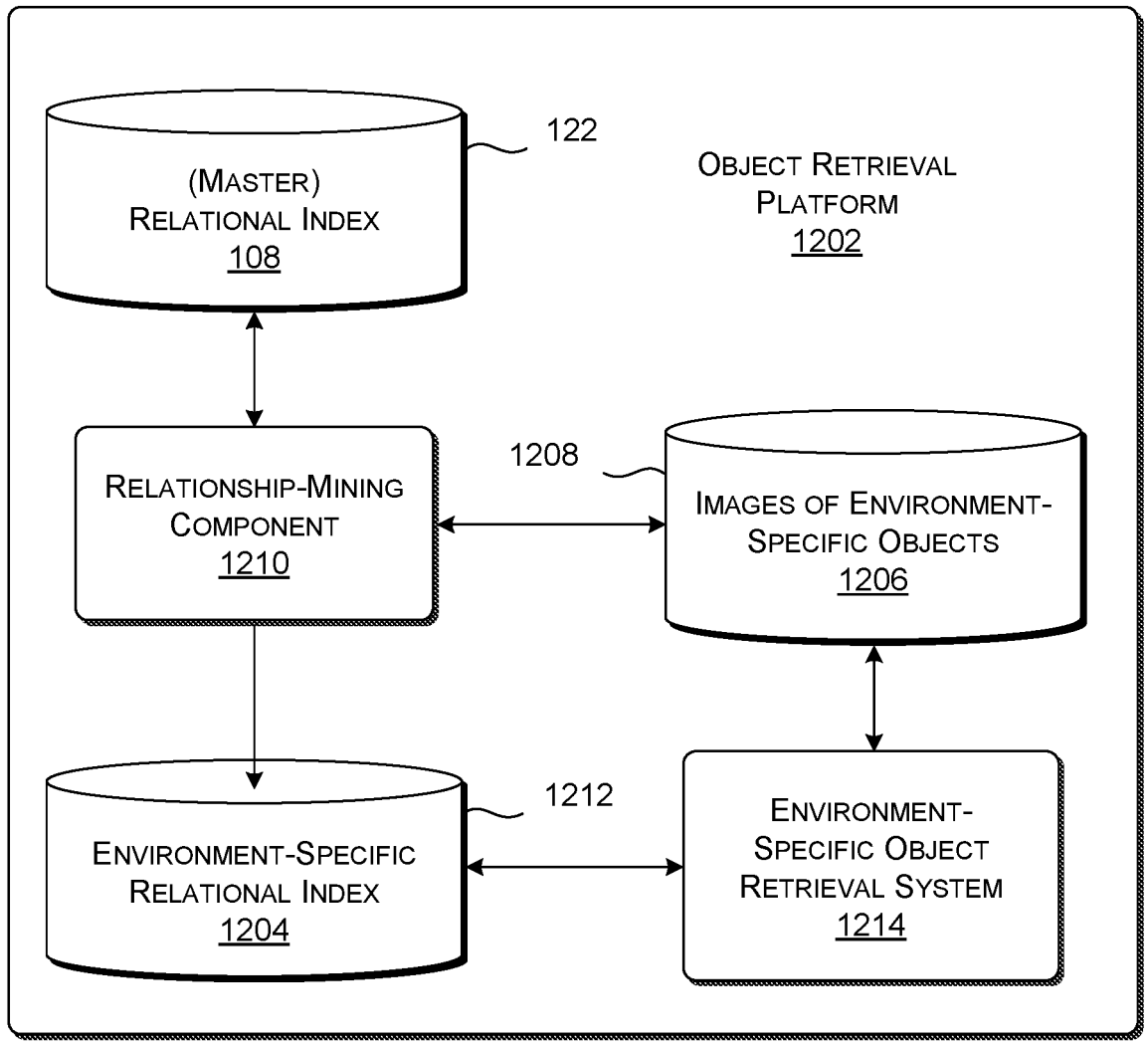
FIG. 12 shows an object retrieval platform for creating an environment-specific relational index. An environment-specific object retrieval system uses the environment-specific relational index to perform a search operation.

FIG. 12 shows an object retrieval platform 1202 for creating an environment-specific relational index 1204. For instance, assume that a department store includes a catalogue of products that it sells. Assume that it also includes a set of high-quality images 1206 in a data store 1208 that depict those products. A relationship-mining component 1210 extracts all of the index entries in the master relational index 108 (described above) that match items in the department store's catalogue (and the relationships among these index entries), and excludes all other index entries and relationships. It then stores that subset of index entries and links in a data store 1212. That subset of objects and links constitutes an environment-specific relational index 1204 because it is specifically tailored to suit the catalogue selection of a particular establishment.

An environment-specific object retrieval system 1214 performs the same functions as the object retrieval system 106 described above, but within the narrower context defined by the environment-specific relational index 1204. The environment-specific object retrieval system 1214 can also show images obtained from its catalogue, as stored in the data store 1208. This helps provide a uniform user experience. However, the object retrieval system 1214 can also give the user the option of reviewing images captured by end users that show its products, if so authorized by those end users. For instance, the object retrieval system 1214 can present a personal photograph that shows a person wearing a shirt sold by the department store, rather than, or in addition to, the formal catalogue image for this shirt.

Figure 13:
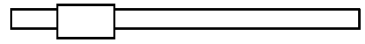
FIG. 13 shows a user interface presentation that solicits search options from a user, for use in conjunction with the object retrieval system of FIG. 11 or FIG. 12.
Figure 13:
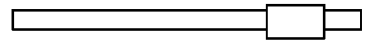
Figure 13:
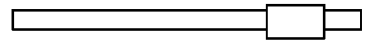

FIG. 13 shows a user interface (UI) presentation 1302 that the UI component 1102 of FIG. 11 can present to the user. It allows the user to specify aspects of his or her search objective in submitting a search query. It also allows the user to specify the behavior of the object retrieval system 106 in response to the submission of the search query. For instance, in a region 1304, the UI component can allow the user to specify: the source(s) from which matching objects are obtained; the type(s) of matching objects that are to be displayed; the type(s) of matching objects that should be excluded; the relationship(s)-of-interest between the query object and related objects; the timespan from which matching objects are obtained (with respect to the time-of-creation of the objects), etc. These criteria are set forth in the spirit of illustration, not limitation; the UI presentation 1302 can allow the user to control the matching performed by the object retrieval system 106 in yet additional ways.

In region 1306, the UI presentation 1302 also includes various options for controlling how the UI component 1102 presents the search results to the user. For instance, the UI presentation 1302 can allow the user to instruct the object retrieval system 106 to remove duplicates in the search results, to order the search results by popularity or time, etc., and so on.

Figure 14:
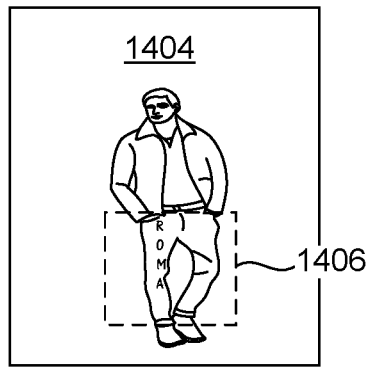
FIGS. 14-17 show user interface presentations that can be presented by the object retrieval system of FIG. 11 or FIG. 12. These presentations allow the user to interrogate each object retrieval system, and, in response, receive search results from the object retrieval system.
Figure 14:
Figure 14:
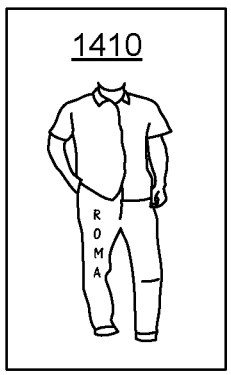
Figure 14:
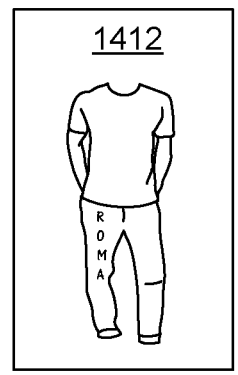
Figure 14:
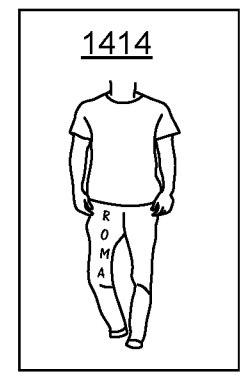
Figure 14:
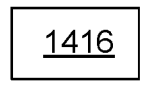
Figure 14:
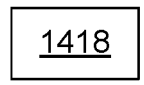
Figure 14:
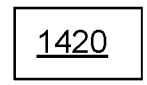
Figure 14:
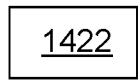
Figure 14:
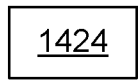
Figure 14:
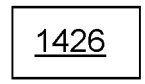

FIG. 14 shows another UI presentation 1402 provided by the UI component 1102. Here, the user interacts with the UI component 1102 to specify a query object in an image 1404, e.g., by moving a bounding box 1406 such that it encompasses the query object. The query object in this example specifies a pair of pants. Further assume that the user specifies (via the UI presentation 1302 or the like) that he or she is interested in viewing objects that have a complementary relationship to the query object.

In response, the object retrieval system 106 identifies search results 1408 that include plural set of images. Each image complements the pair of pants identified by the user. For instance a first set of images (1410, 1412, 1414, . . . ) identifies complementary shirts. Here, each of these images (1410, 1412, 1414, . . . ) shows a model wearing both the pants identified by the user and a complementary shirt. But in another case, the search results 1408 can show just images of complementary shirts. The search results 2408 optionally also show complementary shoes in images (1416, 1418, 1420, . . . ), complementary hats in images (1422, 1424, 1426, . . . ), etc. The application-side object-filtering component 1112 can form these groups by clustering related complementary objects, and then selecting a set of the top-ranking images from each thus-identified group.

Figure 15:
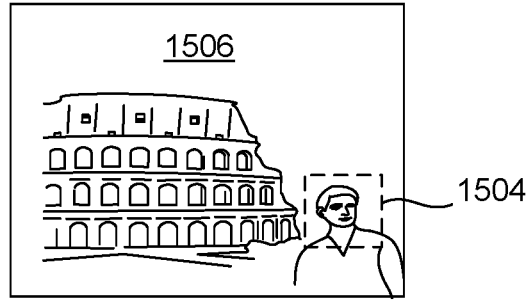
Figure 15:
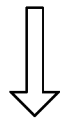
Figure 15:
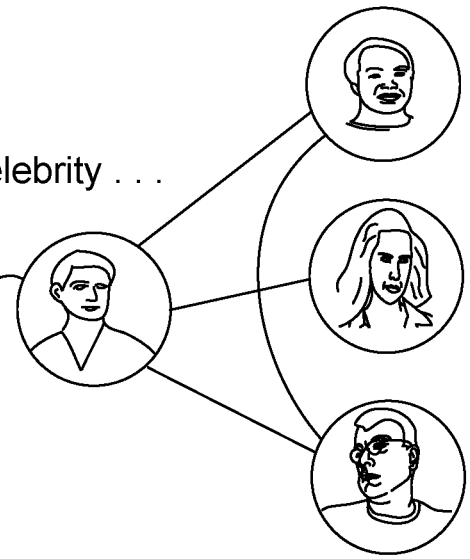

FIG. 15 shows a UI presentation 1502 in which a user selects a query object 1504 associated with a particular person in an image 1506. Assume that the application-side object extracting component 1106 uses face recognition technology to determine that the query object corresponds to a celebrity. Further assume that the user specifies that he or she is interested in determining the *nexus* between the person shown in the query object and other celebrities.

In response, the object retrieval system 106 provides search results 1508 that show a set of face-related objects 1510 that co-occur in images with the query object. The search results 1508 can also optionally show links that connect a face-related object 1512 associated with the query object with the set of face-related objects 1510. In other words, the search results 1508 show a social graph having a pivot point that corresponds to the query object. The search results 1508 can optionally also provide graphical prompts 1514 that invite the user to view actual source images in which the query object appears with one or more of the identified face-related objects 1510.

Figure 16:
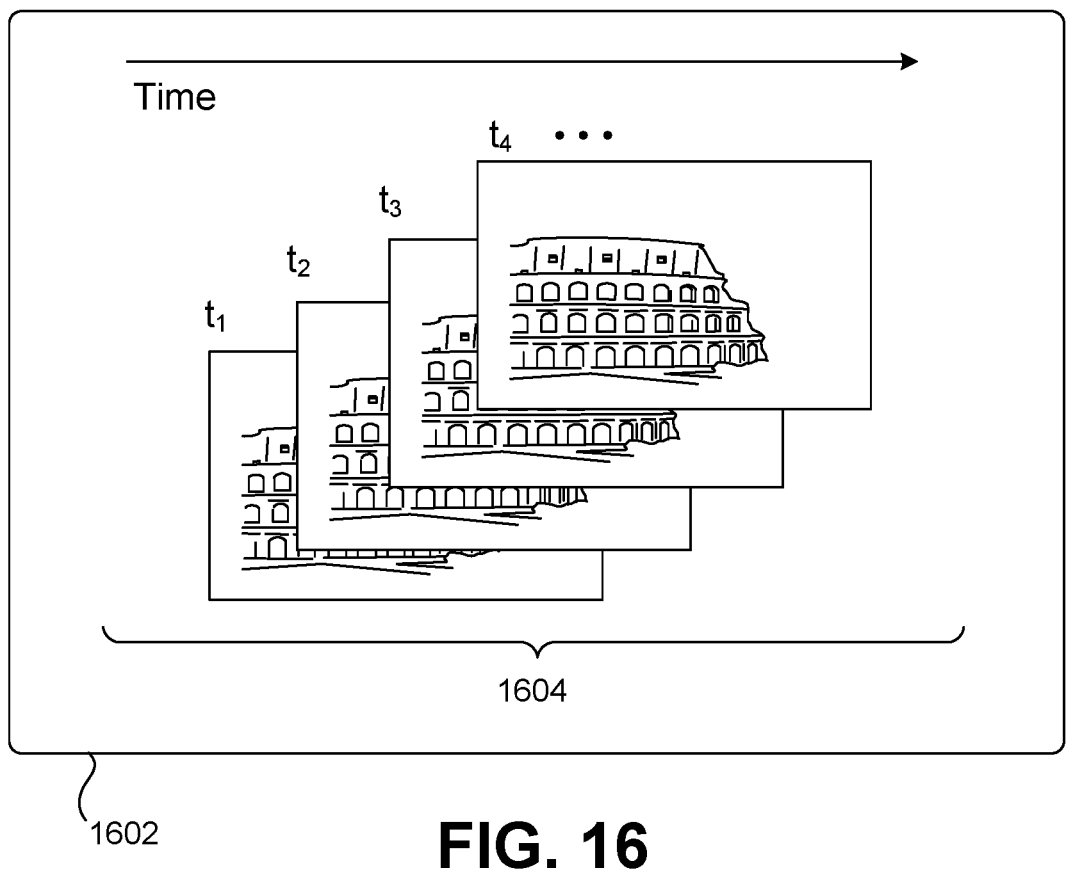

FIG. 16 shows a UI presentation 1602 that shows search results that arrange images 1604 that include the same query object (here the Roman Coliseum) by time of capture. For instance, the user can request this succession of images to view progress on a multiyear reconstruction projection.

Figure 17:
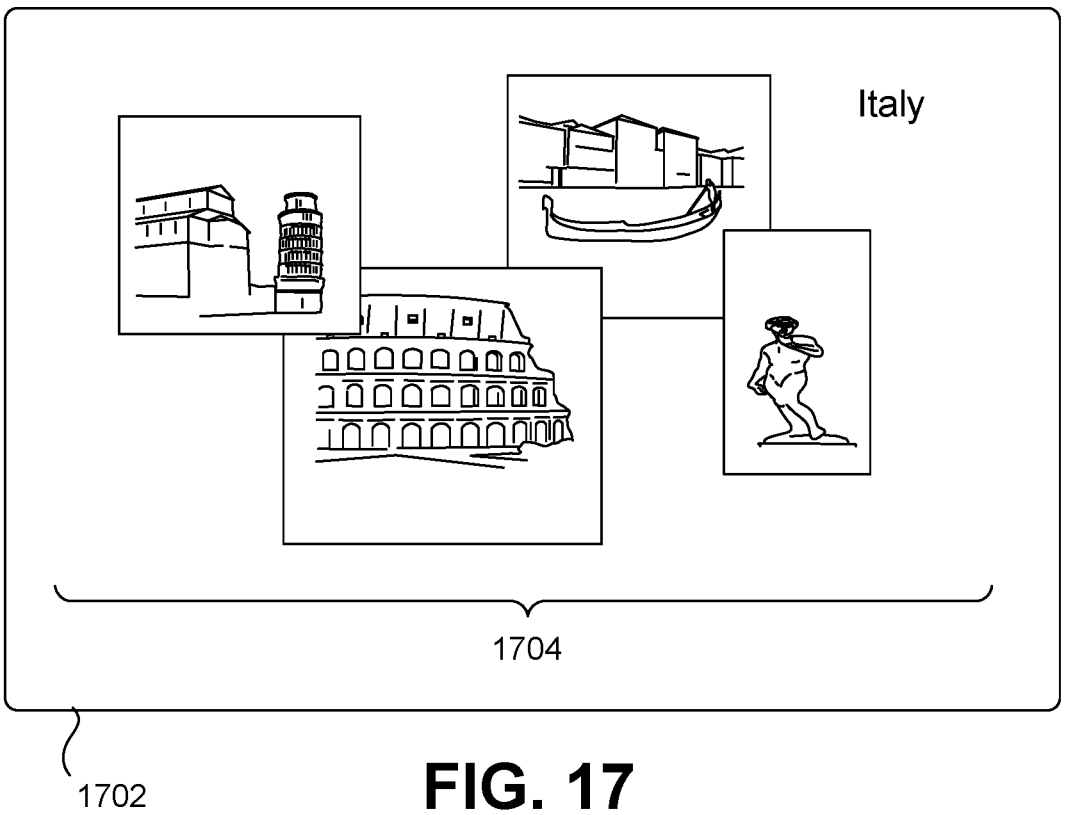

FIG. 17 shows a UI presentation 1702 that shows search results that provide a set of images 1704 tagged with the location "Italy." Although not shown, the user can request search results by specifying two or more attributes, such as location and time.

In another application, a user may instruct the object retrieval system 106 to find similar objects to a specified query object, but not duplicate copies of the same query object. The object retrieval system 106 can perform this task by using an approximate nearest neighbor (ANN) technique to find images having latent semantic vectors that are within a distance $\lambda_2$ to a latent semantic vector associated with the query object, but not closer than a distance $\lambda_1$ to the latent semantic vector associated with the query object.

In another application, a user may instruct the object retrieval system 106 to find all images in which a specified query object appears, with a specified degree of tolerance as to what constitutes duplicate versions of the query object. The object retrieval system 106 can perform this task using an ANN technique. The user can then examine these images to determine if they represent a copyright infringement of the user's query object.

B. Illustrative Processes

Figure 18:
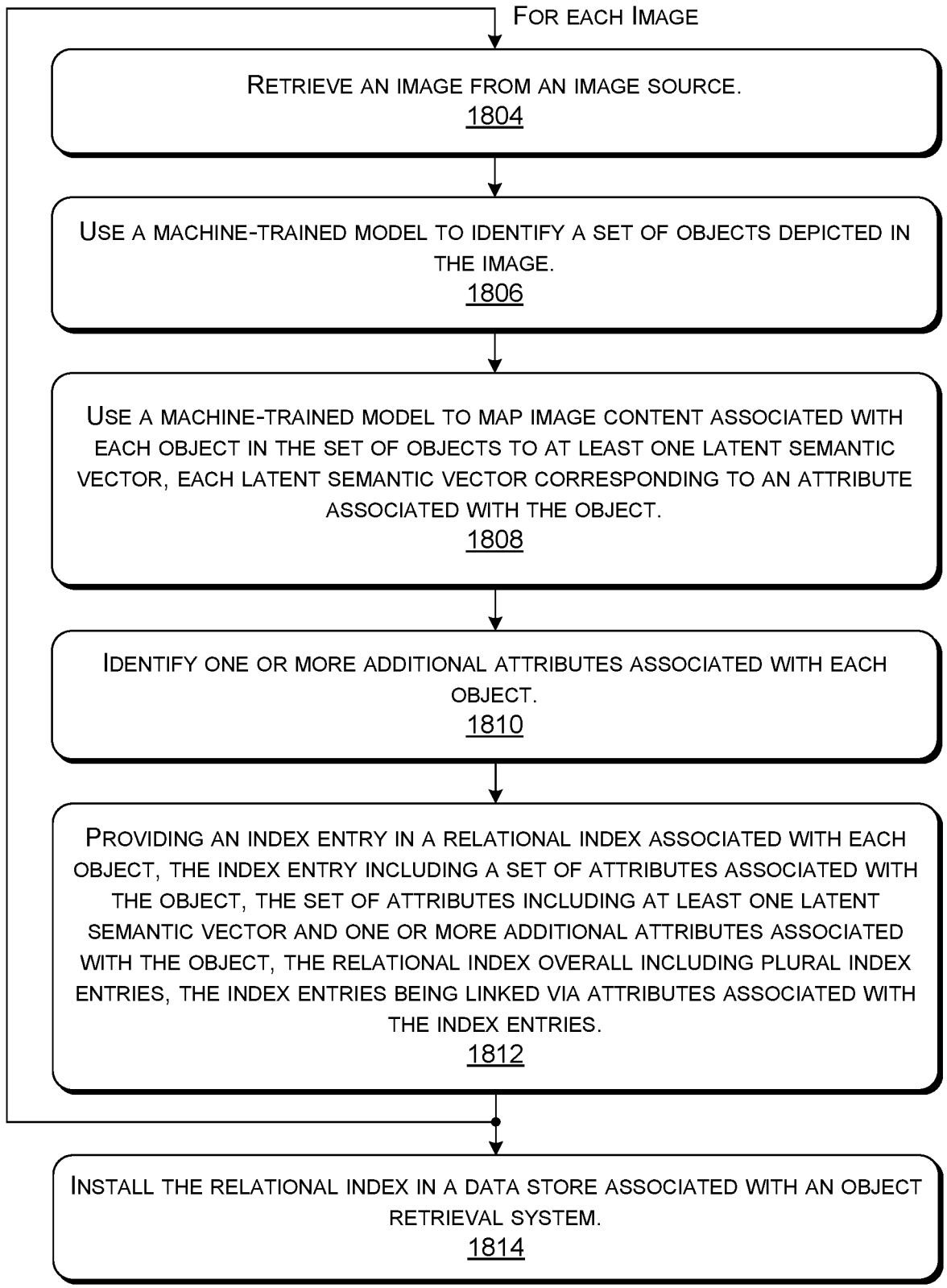
FIG. 18 shows a process that represents an overview of the object extraction system of FIG. 1.
Figure 19:
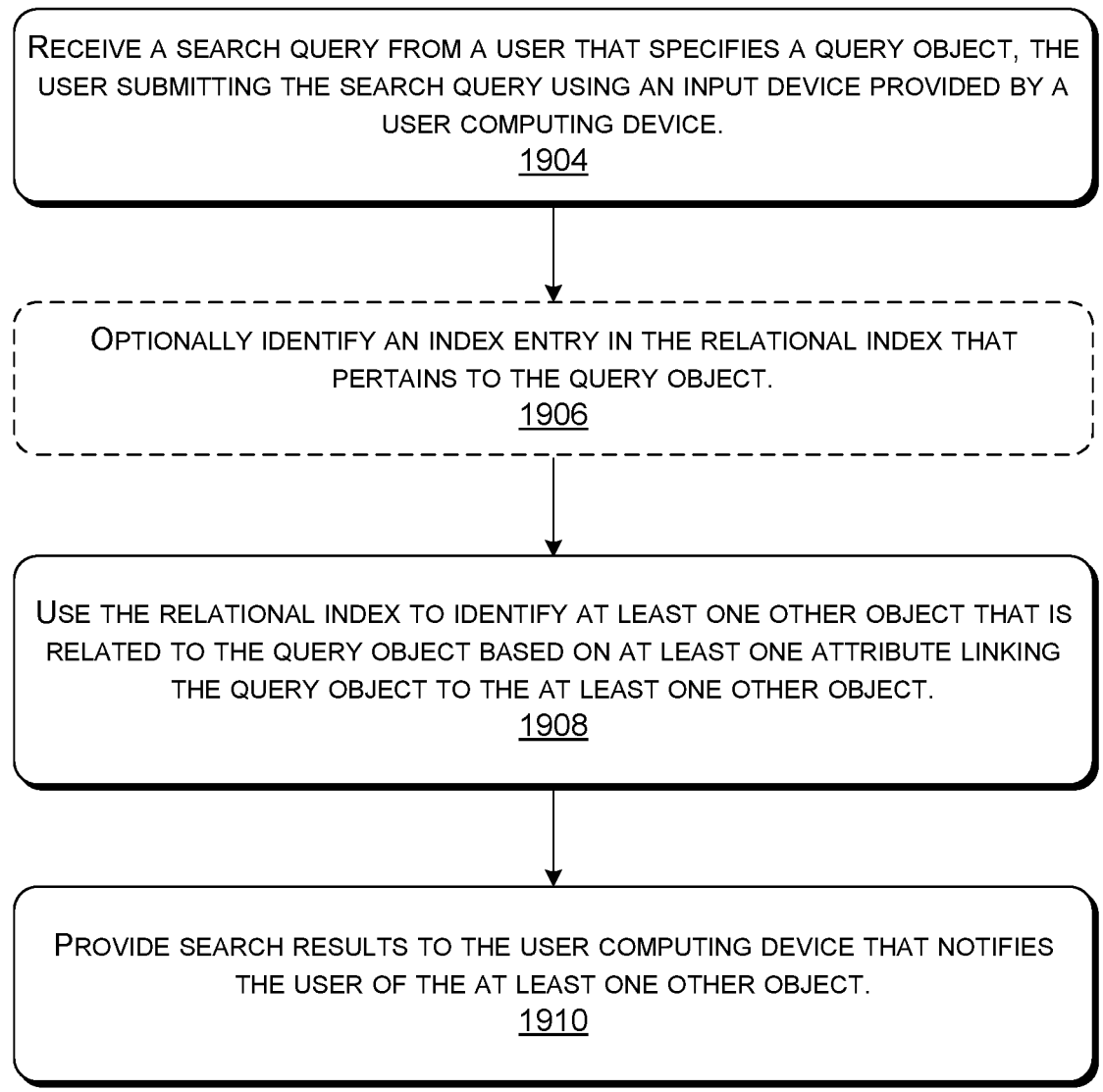
FIG. 19 shows a process that represents an overview of the object retrieval system of FIG. 11 or 12.

FIGS. 18 and 19 show processes that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 18 shows a process 1802 that represents an overview of the object extraction system 104 of FIG. 1. More specifically, the object extraction system 104 performs the steps shown in FIG. 18 for each of a plurality of images, e.g., either in series or in parallel. In block 1804, the object extraction system 104 retrieves an image from an image source. In block 1806, the object extraction system 104 uses a machine-trained model to identify a set of objects depicted in the image. In block 1808, the object extraction system 104 uses a machine-trained model to map image content associated with each object in the set of objects to at least one latent semantic vector, each latent semantic vector corresponding to an attribute associated with the object. In block 1810, the object extraction system 104 identifies one or more additional attributes associated with each object. In block 1812, the object extraction system 104 provides an index entry in a relational index 108 associated with each object, the index entry including a set of attributes associated with the object, the set of attributes including at least one latent semantic vector and one or more additional attributes associated with the object. The relational index 108 overall includes plural index entries, the index entries being linked via attributes associated with the index entries. After processing a desired number of images in the above-described manner, in block 1814, the object extraction system 104 installs the relational index 108 in a data store associated with an object retrieval system 106.

FIG. 19 shows a process 1902 that represents an overview of the object retrieval system 106 of FIG. 11 or 12. In block 1904, the object retrieval system 106 receives a search query from a user that specifies a query object, the user submitting the search query using an input device provided by a user computing device. In block 1906, the object retrieval system 106 optionally identifies an index entry in the relational index 108 that pertains to the query object. In block 1908, the object retrieval system 106 uses the relational index 108 to identify at least one other object that is related to the query object based on at least one attribute linking the query object to the at least one other object. In block 1910, the object retrieval system 106 provides search results to the user computing device that notifies the user of the at least one other object.

C. Representative Computing Functionality

Figure 20:
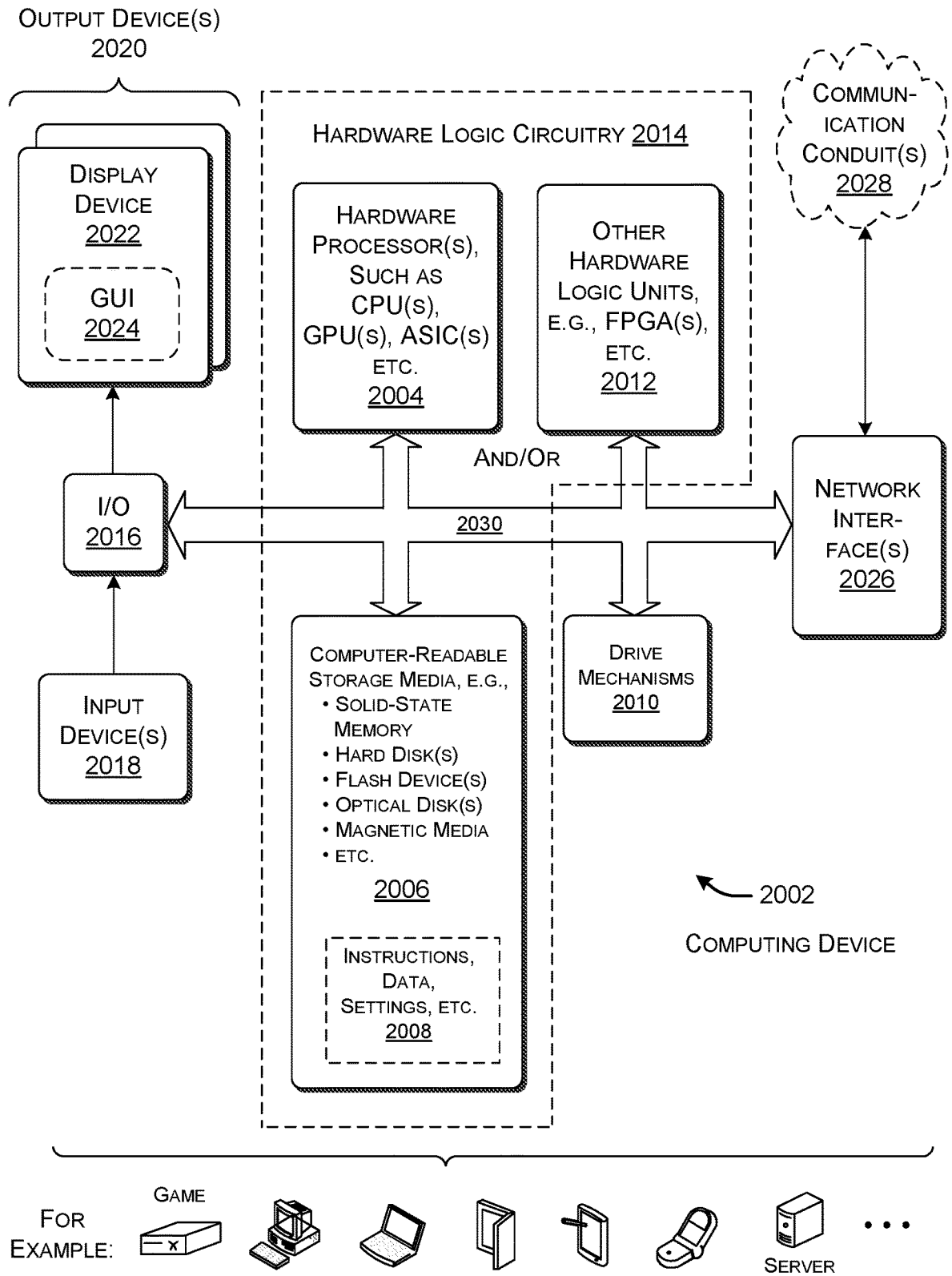
FIG. 20 shows an illustrative type of computing device that can be used to implement any aspect of the features shown in the foregoing drawings.

FIG. 20 shows a computing device 2002 that can be used to implement any aspect of the mechanisms set forth in the above-described figures. For instance, with reference to FIG. 3, the type of computing device 2002 shown in FIG. 20 can be used to implement any server or user computing device, etc. In all cases, the computing device 2002 represents a physical and tangible processing mechanism.

The computing device 2002 can include one or more hardware processors 2004. The hardware processor(s) 2004 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 2002 can also include computer-readable storage media 2006, corresponding to one or more computer-readable media hardware units. The computer-readable storage media 2006 retains any kind of information 2008, such as machine-readable instructions, settings, data, etc. Without limitation, for instance, the computer-readable storage media 2006 may include one or more solid-state devices, one or more magnetic hard disks, one or more optical disks, magnetic tape, and so on. Any instance of the computer-readable storage media 2006 can use any technology for storing and retrieving information. Further, any instance of the computer-readable storage media 2006 may represent a fixed or removable unit of the computing device 2002. Further, any instance of the computer-readable storage media 2006 may provide volatile or non-volatile retention of information.

The computing device 2002 can utilize any instance of the computer-readable storage media 2006 in different ways. For example, any instance of the computer-readable storage media 2006 may represent a hardware memory unit (such as Random Access Memory (RAM)) for storing transient information during execution of a program by the computing device 2002, and/or a hardware storage unit (such as a hard disk) for retaining/archiving information on a more permanent basis. In the latter case, the computing device 2002 also includes one or more drive mechanisms 2010 (such as a hard drive mechanism) for storing and retrieving information from an instance of the computer-readable storage media 2006.

The computing device 2002 may perform any of the functions described above when the hardware processor(s) 2004 carry out computer-readable instructions stored in any instance of the computer-readable storage media 2006. For instance, the computing device 2002 may carry out computer-readable instructions to perform each block of the processes described in Section B.

Alternatively, or in addition, the computing device 2002 may rely on one or more other hardware logic units 2012 to perform operations using a task-specific collection of logic gates. For instance, the hardware logic unit(s) 2012 may include a fixed configuration of hardware logic gates, e.g., that are created and set at the time of manufacture, and thereafter unalterable. Alternatively, or in addition, the other hardware logic unit(s) 2012 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 20 generally indicates that hardware logic circuitry 2014 includes any combination of the hardware processor(s) 2004, the computer-readable storage media 2006, and/or the other hardware logic unit(s) 2012. That is, the computing device 2002 can employ any combination of the hardware processor(s) 2004 that execute machine-readable instructions provided in the computer-readable storage media 2006, and/or one or more other hardware logic unit(s) 2012 that perform operations using a fixed and/or programmable collection of hardware logic gates. More generally stated, the hardware logic circuitry 2014 corresponds to one or more hardware logic units of any type(s) that perform operations based on logic stored in and/or otherwise embodied in the hardware logic unit(s).

In some cases (e.g., in the case in which the computing device 2002 represents a user computing device), the computing device 2002 also includes an input/output interface 2016 for receiving various inputs (via input devices 2018), and for providing various outputs (via output devices 2020). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 2022 and an associated graphical user interface presentation (GUI) 2024. The display device 2022 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 2002 can also include one or more network interfaces 2026 for exchanging data with other devices via one or more communication conduits 2028. One or more communication buses 2030 communicatively couple the above-described units together.

The communication conduit(s) 2028 can be implemented in any manner, e.g., by a local area computer network, a wide area computer network (e.g., the Internet), point-to-point connections, etc., or any combination thereof. The communication conduit(s) 2028 can include any combination of hardwired links, wireless links, routers, gateway functionality, name servers, etc., governed by any protocol or combination of protocols.

FIG. 20 shows the computing device 2002 as being composed of a discrete collection of separate units. In some cases, the collection of units may correspond to discrete hardware units provided in a computing device chassis having any form factor. FIG. 20 shows illustrative form factors in its bottom portion. In other cases, the computing device 2002 can include a hardware logic unit that integrates the functions of two or more of the units shown in FIG. 1. For instance, the computing device 2002 can include a system on a chip (SoC or SOC), corresponding to an integrated circuit that combines the functions of two or more of the units shown in FIG. 20.

The following summary provides a non-exhaustive set of illustrative aspects of the technology set forth herein.

According to a first aspect, a computer-implemented method for generating and applying a relational index is described. The method includes, for each of a plurality of images: retrieving an image from an image source; using a machine-trained model to identify a set of objects depicted in the image; using a machine-trained model to map image content associated with each object in the set of objects to at least one latent semantic vector, each latent semantic vector corresponding to an attribute associated with the object; identifying one or more additional attributes associated with each object; and providing an index entry in a relational index associated with each object, the index entry including a set of attributes associated with the object, the set of attributes including at least one latent semantic vector and one or more additional attributes associated with the object. The relational index overall includes plural index entries, the index entries being linked via attributes associated with the index entries. The method also includes installing the relational index in a data store associated with an object retrieval system. In an application phase, the method includes: receiving a search query from a user that specifies a query object, the user submitting the search query using an input device provided by a user computing device; using the relational index to identify at least one other object that is related to the query object based on at least one attribute linking the query object to the at least one other object; and providing search results to the user computing device that notifies the user of the at least one other object.

According to a second aspect, the operation of identifying one or more additional attributes includes, for a given object associated with a given image: identifying the given image in which the given object appears; and identifying a page on which then given image appears.

According to a third aspect, the operation of identifying one or more additional attributes includes, for a given object associated with a given image, identifying whether the given object is correlated with one or more other objects in the given image.

According to a fourth aspect, relating to the third aspect, the operation of identifying whether the given object is correlated includes determining whether the given object and another object are associated with a same parent object in the given image.

According to a fifth aspect, the operation of identifying one or more additional attributes includes, for a given object associated with a given image, identifying an entity associated with the given object.

According to a sixth aspect, the method further includes, for each given object in a given image, determining whether to include an index entry for the given object in the relational index, the determining using a machine-trained model to determine whether a quality associated with the given object satisfies a prescribed quality test.

According to a seventh aspect, one or more computing devices for generating a relational index is described. The computing device(s) include hardware logic circuitry, which, in turn, includes: (a) one or more hardware processors that perform operations by executing machine-readable instructions stored in a memory, and/or (b) one or more other hardware logic units that perform operations using a task-specific collection of logic gates. The operations include, for each of a plurality of images: retrieving an image from an image source; using a machine-trained model to identify a set of objects depicted in the image; using a machine-trained model to map image content associated with each object in the set of objects to at least one latent semantic vector, each latent semantic vector corresponding to an attribute associated with the object; identifying one or more additional attributes associated with each object; and providing an index entry in a relational index associated with each object, the index entry including a set of attributes associated with the object, the set of attributes including at least one latent semantic vector and one or more additional attributes associated with the object. The relational index overall includes plural index entries, the index entries being linked via attributes associated with the index entries.

According to an eighth aspect, relating to the seventh aspect, the operation of identifying one or more additional attributes includes, for a given object associated with a given image: identifying the given image in which the given object appears; and identifying a page on which the given image appears.

According to an ninth aspect, relating to the seventh aspect, the operation of identifying one or more additional attributes includes, for a given object associated with a given image, identifying whether the given object is correlated with one or more other objects in the given image.

According to a tenth aspect, relating to the ninth aspect, the operation of identifying whether the given object is correlated includes determining whether the given object and another object are associated with a same parent object in the given image.

According to an eleventh aspect, relating to the seventh aspect, the operation of identifying one or more additional attributes includes, for a given object associated with a given image: identifying a time of creation associated with the given object; and identifying a location at which the given object was created.

According to a twelfth aspect, relating to the seventh aspect, the operation of identifying one or more additional attributes includes, for a given object associated with a given image, identifying an entity associated with the given object.

According to a thirteenth aspect, relating to the seventh aspect, the operations further include, for each given object in a given image, using a machine-trained model to determine whether a quality associated with the given object satisfies a prescribed quality test.

According to a fourteenth aspect, relating to the seventh aspect, the operations further include filtering the relational index to extract objects and relations associated with a particular environment, to produce an environment-specific relational index.

According to a fifteenth aspect, a computer-readable storage medium for storing computer-readable instructions is described. The computer-readable instructions, when executed by one or more hardware processors, perform a method that includes: receiving a search query from a user that specifies a query object, the user submitting the search query using an input device provided by a user computing device; using a relational index to identify at least one other object that is related to the query object based on at least one attribute linking the query object to the at least one other object; and providing search results to the user computing device that notifies the user of the at least one other object. The relational index has a plurality of index entries, each index entry being associated with an object that appears in an image, and each index entry associated with an object including a plurality of attributes associated with the object, including an attribute that provides at least one latent semantic vector associated with the object.

According to a sixteenth aspect, relating to the fifteenth aspect, the operation of receiving the search query includes receiving a user's selection of a query object within an image.

According to a seventeenth aspect, related to the fifteenth aspect, the method further includes receiving an input from the user that describes a relationship-of-interest, wherein the operation of using finds the at least one other object by finding one or more objects that are related to the query object with respect to the relationship-of-interest.

According to an eighteenth aspect, relating to the seventeenth aspect, the relationship-of-interest is complementarity, and wherein, as a result, the query object has a complementary relationship with the at least one other object, the complementary relationship being based on a determination that the query object and each of the at least one other object co-occur within one or more images.

According to a nineteenth aspect, relating to the fifteenth aspect, the method further includes filtering the search results to provide plural objects associated with plural classes.

According to a twentieth aspect, relating to the fifteenth aspect, the operation of providing includes providing at least one image associated with the at least one object, the at least one image taken from a data store of environment-specific images associated with a particular environment, an image extraction system generating the relational index based on a more encompassing corpus of images compared to the environment-specific images.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium for storing computer-readable instructions, the computer-readable instructions, when executed by one or more hardware processors, performing a method that comprises;
   receiving a search query tom a user that specifies a query object and a relationship-of-interest, the user submitting the search query using an input device provided by a user computing device;
   using a relational index to identify at least one other object that is related to the query object based on the relationship-of-interest and at least one attribute linking the query object to said at least one other object,
   the relational index having a plurality of index entries,
   each index entry being associated with a particular object that appears in an image, and
   the index entry associated the particular object including a plurality of attributes associated with the particular object, wherein the plurality of attributes includes an attribute that provides at least one latent semantic vector associated with the particular object,
   the relational index omitting one or more objects that have been identified in an object extraction process, in response to determining that said one or more object fail to satisfy one or more tests,
   said omitting also involving omitting one or more relationships among the one or more objects that have been identified; and
   providing search results to the user computing device, wherein the search results that are provided notify the user of said at least one otter object,
   wherein the relationship-of-interest is a complementary relationship, and wherein the complementary relationship is based on a determination that the query object and each of said at least one other object co-occur within one or more images.

2. The computer-readable storage medium of claim 1, wherein the method further includes clustering the search results to provide plural groups of objects associated plural classes, and said providing comprises displaying sets of images associated with respective plural classes, each class having a complementary relation with the query object.

3. The computer-readable storage medium of claim 1, wherein said providing includes providing at least one image associated with said at least one other object, said at least one image being taken from a data store of environment-specific images associated with a particular environment, the environment-specific images in the data store being selected from a larger corpus of images compared to a number of images in the data store of environment-specific images.

4. The computer-readable storage medium of claim 3, wherein the larger corpus of images is a general collection of public images, including user photographs submitted by users, and the data store of environment-specific images are curated catalogue images that omit user photographs.

5. The computer-readable storage medium of claim 3, wherein a particular image in the data store of environment-specific images is not included in the larger corpus of images, but is a proxy of a corresponding image in the larger corpus of images.

6. The computer-readable storage medium of claim 3, wherein a particular image in the data store of environment-specific images is also included in the larger corpus of images.

7. The computer-readable storage medium of claim 3, wherein the method further includes providing a control to the user that gives the user an option to view a particular image taken from the larger corpus of images that is a counterpart to a particular displayed image taken from the data store of environment-specific images, but is not included in the data store of environment-specific images.

8. The computer-readable storage medium of claim 1, wherein the search results show a succession of images containing objects that match the query object; arranged by time of capture.

9. A computer-implemented method for performing a search, comprising:
   receiving a search query from a user that specifies a query object and a relationship-of-interest, the user submitting the search query using an input device provided by a user computing device;
   using a relational index to identify at least one other object that is related to the query object based on the relationship-of-interest and at least one attribute linking the query object to said at least one other object,
   the relational index having a plurality of index entries,
   each index entry being associated with a particular object that appears in an image, and
   the index entry associated with the particular object including a plurality of attributes associated with the particular object, wherein the plurality of attributes includes an attribute that provides at least one latent semantic vector associated with the particular object, the relational index omitting one or more objects that have been identified in an object extraction process, in response to determining that said one or more objects fail to satisfy one or more tests, said omitting also involving omitting one or more relationships among the one or more objects that have been identified; and providing search results to the user computing device, wherein the search results that are provided notify the user of said at least one other object, wherein the relationship-of-interest is a complementary relationship, and wherein the complementary relationship is based on a determination that the query object and each of said at least one other object co-occur within one or more images.

10. One or more computing devices for performing a search, comprising:

hardware logic circuitry including: (a) one or more hardware processors that perform operations by executing machine-readable instructions stored in a memory, and/or (b) one or more other hardware logic units that perform the operations using a task-specific collection of logic gates, the operations including:

receiving a search query from a user that specifies a query object and a relationship-of-interest, the user submitting the search query using an input device provided by a user computing device;

using a relational index to identify at least one other object that is related to the query object based on the relationship-of-interest and at least one attribute linking the query object to said at least one other object, the relational index having a plurality of index entries, each index entry being associated with a particular object that appears in an image, and the index entry associated with the particular object including a plurality of attributes associated with the particular object, wherein the plurality of attributes includes an attribute that provides at least one latent semantic vector associated with the particular object, the relational index omitting one or more objects that have been identified in an object extraction process; in response to determining that said one or more object fail to satisfy one or more tests, said omitting also involving omitting one or more relationships among the one or more objects that have been identified; and providing search results to the user computing device, wherein the search results that are provided notify the user of said at least one other object, wherein the relationship-of-interest is a complementary relationship, and wherein the complementary relationship is based on a determination that the query object and each of said at least one other object co-occur within one or more images.

* * * * *